United States Patent [19]
Khudenko

[11] Patent Number: 5,514,278
[45] Date of Patent: May 7, 1996

[54] COUNTERFLOW MICROBIOLOGICAL PROCESSES

[76] Inventor: Boris M. Khudenko, 744 Moores Mill Rd., Atlanta, Ga. 30327

[21] Appl. No.: 181,387

[22] Filed: Jan. 13, 1994

Related U.S. Application Data

[63] Continuation-in-part of Ser. No. 102,618, Aug. 5, 1993, which is a continuation-in-part of Ser. No. 46,788, Apr. 12, 1993.

[51] Int. Cl.$^6$ ...................................................... C02F 3/30
[52] U.S. Cl. ............................ 210/605; 210/625; 210/631
[58] Field of Search ................................ 210/605, 616, 210/625, 631, 695, 723, 748, 663, 610, 611, 630

[56] References Cited

U.S. PATENT DOCUMENTS

| | | | |
|---|---|---|---|
| 4,193,866 | 3/1980 | Slusarczuk et al. | 210/625 |
| 4,200,524 | 4/1980 | Levin | 210/616 |
| 4,919,815 | 4/1990 | Copa et al. | 210/631 |
| 5,057,220 | 10/1991 | Harada et al. | 210/605 |
| 5,192,442 | 3/1993 | Piccirillo | 210/605 |

*Primary Examiner*—Thomas Wyse
*Attorney, Agent, or Firm*—Needle & Rosenberg

[57] ABSTRACT

A multistage biological treatment method receives material to be treated, and passes the material through multiple reactors. From each reactor some of the contents are removed and separated, and the biomass is moved into the previous stage while the material to be treated and metabolic products are moved into the succeeding stage. Thus, the predominant flow of the biomass is upstream and the predominant flow of the material to be treated in downstream. Preferably, alternate reactors are anaerobic, and alternate reactors are aerobic, so the material is alternately subjected to anaerobic, then aerobic, environments. The process can be improved by applying physical, physical-chemical, chemical, and biochemical actions to the treatment system.

23 Claims, 10 Drawing Sheets

ID PROCESSES

CROSS-REFERENCE TO RELATED APPLICATIONS

This application is a continuation-in-part of the application by the same inventor, filed Aug. 5, 1993, under Ser. No. 08/102,618, which is a continuation-in-part of the application, filed Apr. 12, 1993, under Ser. No. 08/046,788.

BACKGROUND OF THE INVENTION

1. Field of the Invention

This invention relates generally to industrial biological methods and processes for treatment of wastewater, wastewater sludges, and solid, liquid and gaseous organic materials, and is more particularly related to a counterflow system wherein the influent flows generally in a first direction and the sludge flows generally in the opposite direction.

2. Description of the Prior Art

Many biological technologies have been first applied to wastewater treatment, and later used in other applications, sometimes related to the environmental technologies. Wastewater treatment methods and apparatuses are described in literature, for example, in the following sources:

*Water and Wastewater Engineering*, Vols. 1 and 2 by Gordon Maskew Fair, John Charles Geyer and Daniel Alexander Okun, John Wiley & Sons, 1958;

*Biological Waste Treatment* by Wesley W. Eckenfelder and Donald J. O'Connor, Pergamon Press, 1961;

*Water Preparation for Industrial and Public Water Supplies* by A. A. Kastalsky and D. M. Mints, Publishing House Higher Education, Moscow, 1962 (Russian);

*Treatment of Natural Waters* by V. A. Klyachko and I. E. Apeltsin, Publishing House Stroyizdat, Moscow, 1971 (Russian);

*Pysicochemical Processes* By Walter J. Weber, Wiley-Interscience, New York, 1971;

"Anaerobic Waste Treatment Fundamentals" by Perry L. McCarty, Public Works, pp. 107–112, September 1974, pp. 123–126, October 1974, pp. 91–94, November 1974, pp. 95–99, December 1974;

*Biochemical Treatment of Wastewater from the Organic Chemicals Manufacturing* by F. V. Porutsky, Moscow, Publisying House Khimiya, 1975 (Russian);

*Chemistry for Environmental Engineering* by Clair N. Sawyer and Perry L. McCarty, McGraw-Hill, 1978;

Metcalf & Eddy's *Wastewater Engineering* Vols. 1 and 2, Edited by George Tchobanoglous, McGraw-Hill, 1979;

*Biological Process Design* by Larry D. Benefield and Clifford W. Randall, Prentice Hall, 1980;

*Water Chemistry* by Vernon L. Snoeyink and David Jenkins, John Wiley & Sons, 1980,

*Low-Maintenance, Mechanically Simple Wastewater Treatment Systems* by Linvil G. Rich, McGraw-Hill Book Company, 1980;

*Biochemical Processes In Wastewater Treatment* by S. V. Yakovlev and T. A. Karyukhina, Stroyizdat, Moscow, 1980 (Russian);

*Handbook on Design of Wastewater Treatment Systems*, Edited by V. N. Samokhin and Boris M. Khudenko, Allerton Press, New York, 1986;

*Industrial Water and Wastewater Systems* by S. V. Yakovlev, Ya. A. Karelin, Yu. M. Laskov, Yu. V. Voronov, Publishing House Stroyizday, Moscow, 1990 (Russian);

*Design of Anaerobic Processes for the Treatment of Industrial and Municipal Wastes*, Edited by Joseph F. Malina and Frederick G. Pohland, Technomic Publishing Co., 1992.

Various fundamental and practical aspects of the relevant water and wastewater treatment processes are described in the above listed sources. These data are also applicable to other processes, for example, conversion of slid and liquid waste and other materials into biogas and biological fertilizers and soil augmentation substances.

Several modifications of wastewater treatment processes have been developed: 1. aerobic (activated sludge process, lagoon systems, and biofiltration), 2. anaerobic (various attached and suspended growth processes), and 3. combined anaerobic-aerobic systems.

Modern activated sludge systems are used for removal of organics and suspended solids, and for control of nutrients. In these systems, the predominant co-current flow of biomass (activated sludge) is used. In suspended growth systems, sludge recycle from the final sludge separator to the head of the treatment process is provided. These systems often incorporate several functional zones, usually called anaerobic (nonaerated, preferably with low nitrate and nitrite in the feed), anoxic (nonaerated, nitrite and nitrate present in the feed water) and aerobic (aerated, dissolved oxygen present in the water, nitrification occurs). Mixed liquor is recycled from downstream zones to upstream zones and the separated activated sludge is recycled from the final clarifier to the head of the process. A so-called single sludge is cultivated in all these zones. This is predominantly aerobic sludge. It includes very few strictly anaerobic organisms. Facultative anaerobic organisms develop in the nonaerated zone; therefore, the nonaerated zone in these systems should be more properly called the facultative zone. This term will be used in the application. The sludge recycle from the final clarifier is intended mainly for controlling the average sludge age, or average for the system food to microorganism (F/M) ratio. The upstream facultative zone serves to control the filamentous growth (selector zone) and to release phosphorus for its improved uptake in the aerobic zone. The facultatively anaerobic organisms are circulated with the sludge throughout the system. Anoxic zones are used for denitrification: the biological reduction of nitrites and nitrates formed in the aerobic zone and directed to the anoxic zone with the mixed liquor. These systems are used for treatment of municipal and low to moderately strong industrial wastewater. Examples of these systems are described in U.S. Pat. No. 3,964,998 and No. 4,876,883. The disadvantages of such systems including the following:

single predominantly aerobic sludge is formed in the system, such sludge having a poor diversity of species and a narrow range of oxidation-reduction and biodegradation ability;

process can be used only for dilute to moderately strong wastewater;

sludge concentration along the process train and along major process zones is almost uniform;

F/M ratio in various process zones varies drastically;

in the downstream sections, the wastewater concentrations are low, while the sludge concentration is about the same as upstream; accordingly, sludge dies off from lack of food, releasing nitrogen, phosphorus, and organics back into the water;

sludge generation by mass and volume is high, accordingly, the sludge disposal costs are high;

sludge age (10 to 30 days in the USA practice) is high and so is the corresponding degree of sludge stabilization;

at high sludge stabilization, the content of organics anaerobically convertible to methane is low and so is the sludge mass and volume reduction in this conversion;

degradation of soluble organic is poor due to limited oxidation-reduction potential (OPR) range, especially, xenobiotic, recalcitrant, or poorly degradable organics (halogenated, and others), usually, the SS content in the influent to the ASP process is limited by about 100 mg/l, otherwise removal of suspended solids is poor;

process stability in response to dynamic overloading and toxic shocks is low;

volatile organics may be emitted to the air in facultative, anoxic and aeration sections.

The combined anaerobic-aerobic systems have been developed and used during the past fifty years for treatment of concentrated industrial wastewater. These systems incorporate a separate anaerobic subsystem (functional section) with the final anaerobic clarifier and sludge recycle, and aerobic subsystem (functional section) with the final clarifier as a sludge separation and sludge recycle step. Only excess aerobic sludge may sometimes be transferred to the anaerobic subsystem. This system has important advantages as compared to aerobic systems: high concentration waste can be treated, lesser quantities of sludge are produced, better removal of soluble and suspended solid organics can be achieved.

However, anaerobic and aerobic functional sections in the anaerobic-aerobic systems are only mechanistically coupled. Sludges in these sections do not interact: their make-up and properties abruptly change from anaerobic to aerobic stage. The major disadvantages of anaerobic-aerobic systems are as follows:

almost uniform sludge make-up and concentration along the major process zones (poor F/M ratios in various process zones), and poor diversity of species in the sludge in each functional section;

operational difficulties in treating low concentration wastewater;

high sludge age and high degree of sludge stabilization in the aerobic subsystem (low content of organics convertible to methane and low mass and volume reduction in such conversion);

poor removal of suspended solids;

low process stability in response to dynamic overloading and toxic shocks;

low efficiency of degradation of poorly and slowly degradable and toxic organics;

loss of volatile organics to the air in open anaerobic, facultative, anoxic, and aeration sections;

difficulties in removing nutrients (nitrogen and phosphorous).

Several modifications of biofiltration systems have been developed, including aerobic and anaerobic, with and without recirculation, a single, or multiple-stage systems. Various lagoon system have also been developed. Most often they are a series of aerated or nonaerated sections. Hydraulic retention time in lagoons is very long and sludge recycle is not practiced. Processes in lagoons are usually similar to those in ASP, but not intensive and less controlled. Some lagoons may have an anaerobic section, often followed with aerobic sections. Such lagoons are similar to the anaerobic-aerobic systems. Large water volume in the systems insures equalization of wastewater and sludge concentrations and provides a substantial process stability. These systems are mechanically simple and require low maintenance. Many disadvantages of ASP and anaerobic-aerobic processes listed above are also typical for biofilters, lagoon systems and various other modifications of biological wastewater treatment.

Industrial biological methods, such as treatment of polluted gases, composting of solid waste, soil and waters bioremediation methods, treatment of fossil fuels (gas, oil, or coal) have many features in common with the wastewater treatment systems. They also have advantages and disadvantages such as those listed above.

SUMMARY OF THE INVENTION

The main objective of the present invention is to improve biological treatment methods by providing novel flow patterns of wastewater and sludges, and by cultivating sludges most appropriate for the concentration and composition of wastewater in a given process section, by providing a broad rage of sludge compositions and properties.

The objectives of the present invention are achieved by using a treatment system with (1) a general counterflow of the biological sludges and wastewater being treated, (2) a high sludge concentration at the head of the system where the organics concentration is also high, (3) a great diversity of sludge organisms in the systems and gradual change in the biocenoses along the system, and (4) an alternating exposure of wastewater constituents and metabolic products to various functional groups of biological sludges. In such systems, the wastewater constituents are exposed to a broad range of environmental conditions: physical, chemical, and biochemical and physical-chemical actions due to the availability of many organism types, enzymes, co-metabolizing species (vitamins, growth substances, steroids, nucleic acids, etc.), a broad ORP range, and favorable chemical make up.

Further improvement is provided by establishing functional process zones with specific biocenoses: anaerobic, facultative, anoxic, aerobic, and polishing (tending to become catabolic). A novel type of functional zone with simultaneous anaerobic, anoxic and aerobic activities is developed for the removal of various classes of organics, including biodegradable and recalcitrant and toxic, through oxidations and reductions in a wide ORP range. Biological and chemical pathways of nitrogen removal are employed in such functional zones.

Yet further improvement is due to recirculation of treated or partially treated wastewater back to the upstream sections of the process and passing down biomass from the upstream sections of the process to the downstream locations, thus providing treatment of the original wastewater constituents and the metabolic products under alternating oxidation-reduction and enzymatic conditions. Such treatment also includes nitrogen removal. The use of alternating exposure of organics of the sludge to anaerobic and aerobic conditions is described in the copending patent application Ser. No. 08/046,788.

Additional improvement is in applying to the treatment systems physical actions, such as magnetic, ultrasonic, or radio frequency electromagnetic fields, physical-chemical actions, such as electrolytic action, adsorption, coagulations-flocculation (including electrocoagulation), and chemical actions, such as addition of strong oxidants ($H_2O_2$, ozone, $Fe^{--}$, nitrates, nitrites, and other oxyions) or their internal beneficial reuse. Addition of nutrients, such as nitrogen and phosphorous, and micronutrients, such as microelements and, if needed, biostimulators, such as vitamins, steroids, folic acid, metal naftenates and nucleic acids.

An improvement is also achieved by using biological sulfate reduction with organics oxidation resulting in organics and sulfurous species removal from water simultaneously. Other oxyions $WO_4^-$, $TeO_3^-$, $CO_3^-$, $SO_4^-$, $NO_2^-$, $ReO_4^-$, $CrO_4^-$, $SeO_4^-$, $IO_3^-$, $Cr_2O_7^-$, $IO^-$, $NO_3^-$, $BrO^-$, $ClO^-$, $MnO_4^-$, can also be reduced with the benefits of using oxygen and removing or detoxifying mineral pollutants in the water.

Provisions for reducing air emissions of volatile organic and inorganic constituents from the wastewater treatment processes further improve the system. A variable flow effluent recycling for stabilizing the flow rate across the treatment train may be provided; and, a provision for managing increased flow of more dilute water during a storm event is a further process improvement.

BRIEF DESCRIPTION OF THE DRAWINGS

These and other features and advantages of the present invention will become apparent from consideration of the following specification when taken in conjunction with the accompanying drawings in which.

DETAILED DESCRIPTION OF THE EMBODIMENTS

Basic Counterflow System

Figure 1:
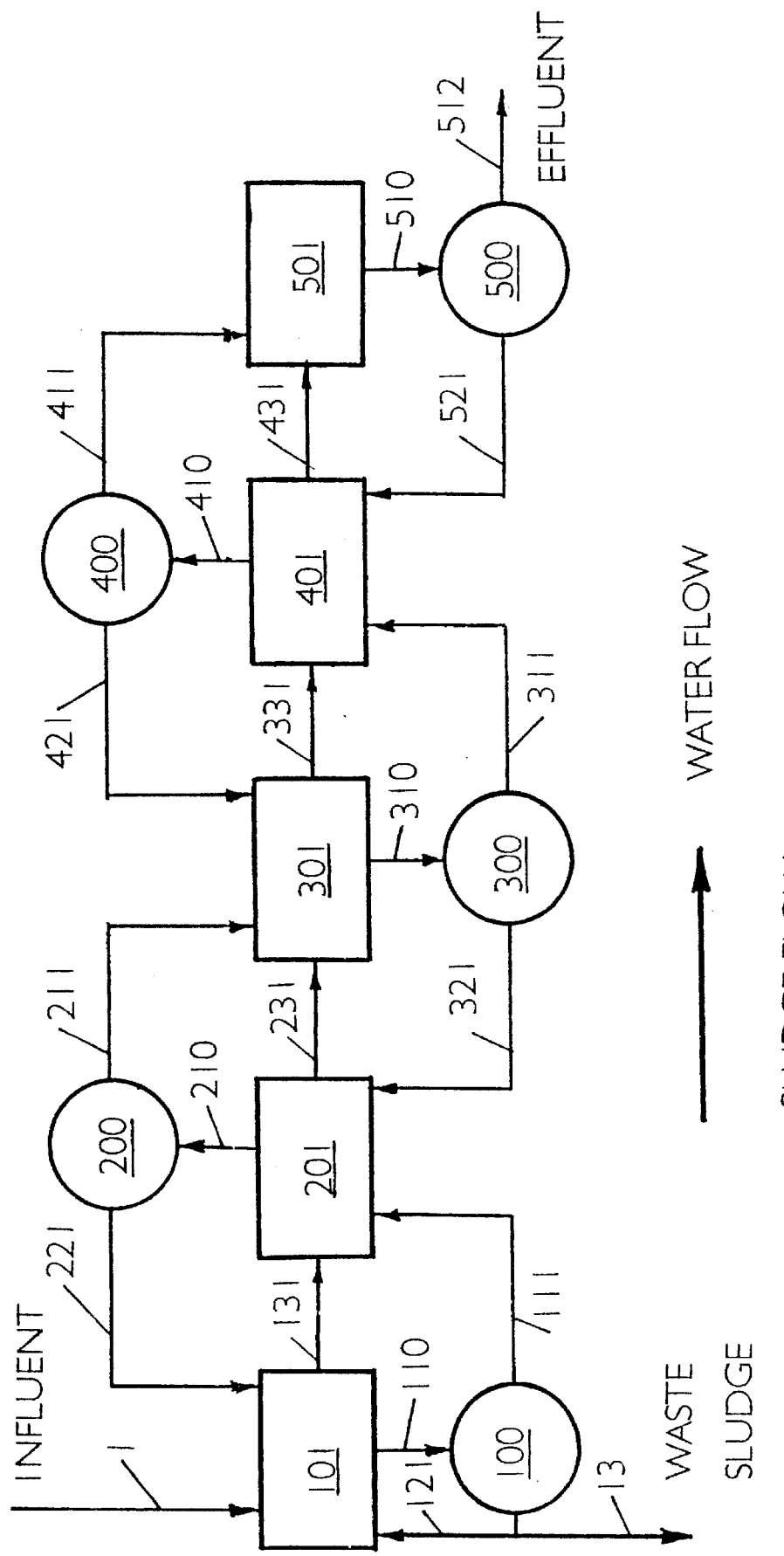
FIG. 1 is a schematic diagram showing the basic counter flow arrangement of the present invention.

The basic counterflow system as shown in FIG. 1 comprises multiple parallel consecutive stages of biological reaction and sludge separation steps, with a fraction of the mixed liquor being fed directly to the downstream stage and the balance of the liquor being fed to the sludge separator. The sludge-free clarified water from the separator is fed to the downstream stage, with the entire flow of water being clarified and discharged in the last stage, and the concentrated separated sludge being backfed in at least one of the preceding stages, or at least partially discharged from the first stage, thus producing general counterflow of the biological sludge and the wastewater. The final sludge discharge is preferably provided at the inlet stage of the counterflow process. Optionally, sludge may be discharged from an intermediate process stage.

In this system, the largest sludge concentration will occur in the upper stages where the food concentration is also the highest; and, the lowest sludge concentration will be found in the last stages of the system where the food concentration is low. Therefore, the F/M ratio along the entire process train can be close to the optimum.

As in the conventional activated sludge processes, in the present basic process, all stages can be aerobic. However, unlike the prior art activated sludge processes, multiple sludge biocenoses are developed in the counterflow systems. In the basic systems with all aerobic functional zones, the sludges in the upper zones are more concentrated and are predominantly microbial. In the lower stages, the sludge concentration is reduced, but the biocenoses is more diverse and includes protozoa. The sludge concentration may be very high (10 g/l on order of magnitude) in the upstream aerobic stage, and changing to very low (possibly, a fraction of 1 g/l) at the downstream end of the system. This will insure more optimal F/M ratios, the condition along the process train in which the available substrate can best support the biocenoses in a given process stage. The release of nutrients (nitrogen and phosphorus) and intracellular organics in the water at the end of the biological treatment step (due the microbes' dying from lack of food) will be largely eliminated. Accordingly, the control of organics and nutrients is improved.

As in conventional anaerobic-aerobic systems, or staged lagoons, specific sludges are developed in particular stages. However, unlike the prior art multistage systems, these sludges have a gradually changing make-up because the biomass is not only retained within a stage, but is also transferred upstream and downstream. A gradual change from a very high to low sludge concentration, and a gradual change in the microbial and enzymatic make-up from the upstream to the downstream, provide greater diversity of actions applied to the original constituents and intermediate metabolic products in wastewater.

Recycling of wastewater with the sludges transferred upstream exposes the metabolic products and incompletely degraded materials to repeated effects of the environments found in upstream process stages. Accordingly, the recycle rate in the new system may be determined not only by the need to transfer the sludge upstream, but also by the requirement to recycle wastewater and metabolic products in it to the upstream zone.

Functional Process Zones

Optionally, anaerobic, facultatively anaerobic, anoxic, aerobic, and polishing zones can be established in the process train. Each zone may be represented by one or multiple process stages. Multiple, but interacting and progressively changing, sludges are formed in each stage in each zone: from the true anaerobic sludge that predominates at the upstream of the system, through facultative anaerobic and anoxic, to the aerobic being dominant at the effluent end. In particular applications the sequence of sludges may change, or certain sludge zones, (e.g. anaerobic) may be repeated, In specific applications, specific sludges (e.g.

anaerobic), may be transferred downstream; however, the predominant flow of the sludges will remain from the downstream to the upstream, in counterflow to the wastewater. Optionally, parallel process stages may be used. Particularly, an aerobic process stage conducted in a biofilter may be established in parallel to the anoxic process stage. Mixed liquor from the anoxic stage is pumped to the biofiltration stage wherein further organics' oxidation and nitrification occur. The nitrified effluent from the biofiltration stage is returned to the anoxic stage for the denitrification. Air fed in the parallel biofiltration step may vent the anaerobic and other stages and pick up the organic and inorganic volatile materials emitted from these stages. These volatile materials will be biologically treated in the biofiltration step, thereby preventing their escape to the air.

Various sludges cultivated in the functional process zones will subject the wastewater constituents to the widest range of enzymes, Oxidation-Reduction Potentials (ORP), and other biological, biochemical, chemical, and physical-chemical actions which can be established with the given wastewater. This provides the best conditions for transformation and removal of waste constituents. Moreover, certain metabolic products formed in the downstream stages (e.g. aerobic), are recycled upstream with the separated sludge and undergo a second round of treatment by a set of microorganisms available upstream in the ORP domain, that would not be available in the downstream process zones. Certain constituents, for example, nitrates and nitrites, recycled from the downstream to the upstream sections will serve as useful reactants. For example, nitrites and nitrates (strong oxidizers) can support oxidation of poorly and slowly degradable organics. Passing down the mixed liquor and the sludges, and returning upstream material from the downstream process zones will subject the original constituents and metabolic products to the alternating treatment conditions, particularly very wide ORP ranges.

Optionally, and for specific applications, sludges may also be transferred downstream, bypassing one or several process stages. The excess sludge from the upstream separator is discharged from the system directly, or after digestion and conditioning.

Anaerobic zones may be further divided into acidification and hydrolyzing zones, and into methanogenic zones and sludge conditioning zones as defined in the co-pending application Ser. No. 08/046,788. The sludge separation devices can combine functions of anaerobic, facultative, anoxic, or aerobic zones. The wastewater influent may be distributed over multiple process stages along the flow. Such distribution may be needed to support generation and accumulation of the sludge mass when treating dilute wastewater, for example, municipal sewage.

In various modifications, specific sludge zones can be established. For example, most upstream zones can be true anaerobic zone, followed by a facultative zone, an anoxic zone, and an aerobic zone. Optionally, a polishing zone, for example, with activated carbon adsorption and coagulation-flocculation zone can be established after the aerobic zone. These zones may partially overlap. They also may shift during operation of the system.

Zones combining several functions, for example, anaerobic with facultative anaerobic, anoxic and aerobic can also be established. Such zones involve either feeding various sludges to the zone, or include means for retaining at least one sludge in this zone, for example, anaerobic, and feeding through other sludges cultivated in other zones, for example, aerobic. As a sludge retaining means, a fixed or fluidized bed can be used.

Wastewater Recycle

In the upstream anaerobic functional zone, a significant fraction of organics is hydrolyzed, and a fraction of it is converted into fatty acids and other degradable compounds. Such transformations are most applicable to the organics that can be easily reduced, or transformed in the reducing anaerobic media. Some fatty acids will be further converted into methane and carbon dioxide. The remaining fatty acids, and the constituents not easily degradable in the anaerobic environment, are transferred to the downstream aerobic zone(s) with the mixed liquor and sludge-free separated water. Most of these constituents have been brought to a reduced state in the anaerobic zone and are readily oxidizable. Moreover, the remaining original wastewater constituents are mixed with anaerobic metabolic products. Such a mixture is nutritionally richer and can support the growth of a more diverse aerobic biocenoses. Accordingly, the biodegradation efficiency (percent degraded) and rate increase. For example, the biodegradation of many single fatty acids (in COD units) ranges from 60 to 80 percent, whereas their mixtures may be 100% degraded.

In the aerobic section, aerobic degradation results in the production of water, carbon dioxide, incompletely degraded products (as expected, in an "oxidized" state), soluble metabolic products, and biomass. Much of the soluble products in the mixed liquor cannot be further degraded aerobically. However, being recycled back into the anaerobic stage, they will be additionally degraded either to the "final" products such as carbon dioxide and methane, or converted into products that will be virtually completely degraded in the next round of the aerobic treatment.

Nitrification will occur in the aerobic and aerated polishing zones. Recycling of the nitrified liquid upstream to the anaerobic or anoxic zones will result in reduction of nitrates and nitrites to nitrogen. Additional denitrification may be provided by using intermittent aeration in the aerobic zone.

The nitrification can be further improved by using powdered activated carbon (PAC) as a support medium for the nitrifying bacteria. Alternatively, a submerged support medium, floating or fixed, can be provided in the aerobic zone, or a biofiltration may be used.

Being very strong oxidants, nitrates and nitrites in the anaerobic and anoxic zones take part in oxidizing poorly degradable, recalcitrant, and toxic organics. Accordingly, their recycling can serve two functions: nitrogen removal, and improved organics removal.

Distributed Influent Feed and Load Allocation

To improve the control over F/M ratio in particular reaction stages, to provide a carbon (organics) source for denitrification, to increase the sludge growth for purposes of absorbing specific pollutants (heavy metals and other microelements, toxic and slowly and poorly degradable organics), a distributed influent feed can be provided. Lines for feeding part of the influent may be used in each reaction stage, or certain stages can be selected during design and operation.

Optionally, a clarified flow of partially treated wastewater, for example after the anaerobic functional zone, can also be distributed over several downstream functional zones similarly to the described distributed influent feed. This option provides sequential anaerobic-aerobic treatment for the entire wastewater flow. Accordingly, a broader range of biochemical, physical-chemical, and chemical transformations will be applied to the entire quantity of pollutants fed into the system.

Physical, Physical-Chemical, Biochemical, and Chemical Actions

The usual phosphorus uptake and removal by the growing biomass will occur in present novel system. If required, the balance of phosphorous should be precipitated, for example, as aluminum and/or iron phosphates. Aluminum and iron used for coagulation in the step of the effluent polishing will take part in phosphorus removal in the polishing and upstream stages where it is back-fed with the biological sludge.

In systems with the powdered activated carbon (PAC) addition in the downstream zones, the separated PAC is recycled upstream and passes with the sludge, in counter-flow to the water. In the polishing step, the PAC functions mostly as an adsorbent; however, a slow biological process on the active surface also occurs, similar to processes in water purification for water supplies. The PAC spent in the polishing stage and transferred upstream acts also as an adsorbent with the increasing role of the biological activity. Subjecting PAC to the alternate aerobic-anaerobic environments is helpful for its bioregeneration.

Separation of PAC, residual suspended solids, and partially dissolved solids can be further improved by the addition of coagulants, (for example, aluminum and iron ions or their combinations), and coagulation and flocculation aids (for example, polymers, silica based aids, etc.). These coagulants and coagulation aids are also recycled upstream together with the sludge. Aluminum and iron ions are used in the upstream sections for phosphorus removal. Iron ions are also essential for microorganisms as a micronutrient. Iron ions are oxidized to the trivalent state in the aerobic stages and reduced to the divalent stage in the anaerobic and anoxic stages. Such cycling or iron species is useful for chemical conversions of organic and inorganic constituents.

Biochemical, physico-chemical, and chemical conversions of constituents in wastewater can be additionally improved by imposing electrical and electromagnetic fields on the liquid in the biological reactors in all, or selected ones, of the functional zones. These fields can increase the process ate and shift equilibrium in many reactions, especially, oxidation-reduction and precipitation equilibria, and also pH dependent processes.

Electrochemical action can be produced by applying a direct current, an alternating current, or an asymmetric current (for example, a combination of direct and alternating currents). A partially rectified direct current, and direct current with a back pulse can also be used. Magnetic fields can be applied with the use of permanent magnets and electromagnets. These actions can be applied to the mixed liquor, mixed liquor with PAC and/or GAC (granular activated carbon), and with coagulants. PAC, GAC, flocculent and bioflock particles and their combinations will serve as fluidized electrodes and micromagnets (particles loaded with iron).

Electric current can be applied to the mixed liquor or sludges at various process steps simultaneously with other actions, for example with addition of the powdered and granular activated carbons. Carbon particles will serve as multiple intermediate electrodes or fluidized electrodes. The electric forces will assist in transforming the materials adsorbed on the carbon. These transformations may include coagulation-flocculation, polymerization, and oxidation-reduction. Electric current may also assist nitrification and denitrification, reduction and oxidation of sulfur species, precipitation of heavy metals, aluminum and iron salts coagulation, and oxidation-reduction involving hydrogen peroxide.

The aerobic and polishing process steps may be enhanced by the addition of hydrogen peroxide, ozone, ultraviolet (UV) radiation or various combinations of these three. Such provisions are not possible in the prior art systems because of the high biomass concentration which makes the mixed liquor nontransparent and rapidly consumes hydrogen peroxide and ozone for nontarget reactions. In the downstream zones of the present system, wastewater and sludge concentrations are low and the mixed liquor is transparent for the UV light. Accordingly, UV light can be used, and hydrogen peroxide can be introduced to react with residual organics in the water being polished.

Besides usual processes, the removal of some inorganics can be achieved in the new system. Particularly, sulfur species, for example sulfates, can be converted into elemental sulfur via biological conversion to sulfites and sulfides in anaerobic steps, and chemical reactions between sulfides and sulfites and sulfates to form sulfur, and sulfides and nitrites and nitrates to form sulfur and nitrogen. Calcium and carbonates can be removed as calcium carbonates. Phosphorus can be removed with calcium, iron, and aluminum. Heavy metals can be largely precipitated with sulfides formed in anaerobic steps.

Stabilized Flow Rate

A time variable recycle of the effluent to the head of the system is provided at the flow rate necessary to complement the influent flow to make up a constant combined flow equal to the maximum influent flow rate. Optionally, a flow equalization tank is provided to reduce the maximum flow rate. In such a case, the complementary effluent recycle rate is reduced to make up for the equalized maximum flow rate. Such provisions stabilize all flows in the system, and insure more stable and simple operation of all process units.

Storm Events

During rain events, the influent flow rate increases, while the pollution loading may remain the same or change only slightly. In such cases the influent will be distributed into several zones along the flow and the effluent will be discharged from the final sludge separators and from one or several preceding sludge separators. Fractions of separated wastewater from these preceding clarifiers may not undergo the whole sequence of treatment; however, the wastewater during storm events is more dilute and needs less treatment. Such an arrangement permits the use of smaller final sludge separators during rain events as compared to conventional systems designed to meet the storm conditions.

Dynamic Operation

During dynamic operation with variable flows and concentrations of admixtures, increased (decreased) incoming loading rates will cause the specific treatment zones to increase (decrease) in size by stretching (shrinking) downstream. This will control and insure stability and high performance under variable input conditions.

Air Pollution Control

The escape of volatile organics and other obnoxious gases, for example, hydrogen sulfide, to the air from an open anaerobic, facultative, anoxic, and aerobic sections can be reduced by collecting the said gases and scrubbing them with the water undergoing the final stages of the aerobic or polishing treatment. This can be done in a separate biofilter, or a biofilter stacked above the other process sections. Alternatively, a double-deck biofiltration can be used with the upper deck irrigated by the wastewater treated in the lower deck, and the lower deck fed with the water from the preceding process steps, for example, the anoxic step. Further improvement of the scrubbing process can be provided by adding PAC to the top deck water in the biofilter. The PAC will then be retained in a sludge separation device and recycled to the preceding process steps as previously described.

Methane gas can be introduced in aerobic stages, for example, by sparging in the aerated chambers, or as admixture to the air in biofilters. Methanotrophic organisms will develop and co-metabolize chlorinated and other poorly degradable organics. The off gas from the anaerobic process stage can be used for this purpose. In case of an open anaerobic stage, this gas can be collected under a hood and picked up by a blower or a fan delivering air in either an aeration basin or in a biofilter. In such a case, the anaerobic off gas will also be treated for hydrogen sulfide and volatile organics.

The present biological method may also be applied to the treatment of industrial gaseous emissions such as venting and breathing devices in chemical, biochemical (fermentation), painting and coating, and other processes emitting organic gasses, organic particulates, and inorganic gases treatable biologically (for example, hydrogen sulfide). The treatment of these emissions may be the same as described for the fugitive gases emitted from the wastewater treatment operations, or it may involve a multistage system similar to the present method of wastewater treatment. For example, the gaseous emission can be fed into an anaerobic reaction stage and then transferred in an aerobic reaction stage. The constituents of pollution, gaseous or particulate, will be scrubbed and adsorbed by the water carrying anaerobic and then aerobic biomass respectively. These two types of biomass (sludges) in two process stages will degrade the said organics, while multiplying the biomass. Similar to the previously described novel method of wastewater treatment, a portion of anaerobic biomass is transferred to the aerobic stage, and a substantial portion of the aerobic biomass is transferred to the anaerobic stage. A sludge condition associated with the anaerobic stage may be provided. PAC can be added to the aerobic process stage. Sludges grown in the system, and the added PAC, will go in a counterflow direction to the pollutant (gaseous) stream. Similar to above described treatment of wastewater, the greatest concentration of biomass and pollutants will be in the head stages of the systems. This system will also provide a great diversity of environmental conditions for the efficient treatment of gas streams.

Similar to the treatment of wastewater, physical, physical-chemical, biochemical, and chemical actions may be applied to the gas treatment. It may be advantageous to add organic substrate to the water used in the biological treatment of dilute gases, or gases with poorly degradable organics to support biological growth and insure process stability. A wastewater may be used as a source or organic substrate.

FIG. 1 illustrates a basic system with counterflow of the activated biological sludge and wastewater. The system consists of consecutive reaction stages 111, 2010, 301, 401 and 501 connected to each other by lines 131, 231, 331 and 431. Wastewater influent line 1 is connected to the stage 101. Lines 110, 210, 310, 410 and 510 connect treatment stages 101, 201, 301, 401 and 501 to sludge separators 100, 200, 300, 400 and 500 respectively. Lines 111, 212, 311 and 411 are provided for transferring the separated sludge-free water to the downstream reactions stages 201, 301, 401 and 501. Line 512 is the effluent discharge line. Lines 221, 321, 421 and 521 are lines for counterflow feeding of the separated concentrated sludge from sludge separators 200, 300, 400 and 500 to reactions stages 101, 201, 301 and 401 respectively. Line 13 is the sludge discharge line connected to the sludge separator 100. Line 121 is an optional sludge recycle in the section comprising the reaction stage 101 and sludge separator 100.

The system of FIG. 1 is operated as follows: The wastewater influent (a sludge free water) is fed via line 1 in the first reaction stage 101 where it contacts the biological sludge and undergoes a partial biological treatment. During this treatment the biological sludge is grown. An additional quantity of concentrated sludge is transferred into the reaction stage 101 from the sludge separator 200 associated with the second reaction stage 201. The mixture of wastewater and the sludge form the mixed liquor. Wastewater is continuously fed into the reaction stage 101 and the mixed liquor is continuously displaced from this stage. Part of the mixed liquor is transferred in the next reaction stage 201. The balance of the mixed liquor is fed into the sludge separator 100. The water fraction (sludge-free water) from the sludge separator is also fed into the next reaction stage 201, while the separated sludge (concentrated sludge) is discharged via line 13. Optionally, part of the sludge separated in the sludge separator 100 may be recycled via line 121 back into the reaction stage 101. The second reaction stage is fed via line 131 with mixed liquor from the reaction stage 101, clarified sludge-free water via line 111 from the sludge separator 100, and with the backfed concentrated sludge via line 321 from the sludge separator 300. The wastewater undergoes additional treatment, and additional sludge is grown in the reaction stage 201. Reactions stage 301 with associated sludge separator 300, reaction stage 401 with sludge separator 400, and reaction stage 501 with sludge separator 500 are operated the same way as the preceding stage except that the last stage where the entire amount of the mixed liquor is directed to the sludge separator 500 and the clarified water is discharged from the system via line 512. Means for aeration, mixing, pH control, nutrients addition, and other well known means can be used, but these means are not shown in FIG. 1.

It is clear from the previous paragraph that the wastewater and the biological sludge in the present system are going in generally counterflow directions. Due to the backfeed of a fraction of the sludge in stages 201, 301 and 401, and all sludge in stage 501, the sludge concentration in the head sections of the system is the greatest, and it declines towards the downstream sections. The wastewater concentration in the system declines from the upstream to the downstream. Accordingly, the F/M ratios vary less along the process train in the present system than in the prior art methods. The highest organics (food) supply corresponds to the greatest concentration of the biological sludge. At the place of the lowest food availability, in the downstream sections, the biological sludge concentration is at a minimum. Accordingly, the food deficiency will not cause a massive die off and release the secondary substrate (a pollutant) and nutrients (also pollutants).

In the present system, the sludges in each stage are largely adapted to the environment in the stage, substrate concentration and composition, F/M ratio, pH, nutrients concentrations, etc. Through the sludge backfeeding, and the mixed liquor pass down, these sludges interact and change gradually. The flow pattern of wastewater is generally downstream. However, water flows with backfeed of sludges, provides some backfeed of water. Under such conditions, at least part of the metabolic products formed in the downstream stages is re-treated in the upstream stages at different environmental conditions and with the use of a wider range of biological and other agents taking part in the processes in these stages.

Under variable influent conditions (variable flow, concentration and composition of substrate), the present system will be operated as follows: short time (high frequency) variations in concentration will be very effectively equalized due to the dilution in the reaction volumes, due to the split parallel flows in the reaction stages and sludge separators with time delay, and due to the backfeed of sludges. At slow variations (low frequency), the treatment process may be virtually completed, for example at a prolonged low loading rate, in the reaction stage 301. Very little treatment, if any, will occur in stages 401 and 501. Accordingly, sludge concentrations in stages 401 and 501 will also decline. As the loading rate increases, the organic substrate (food) is not completely consumed in the stage 301 and some organics enter stage 401. Due to greater food supply, the sludge growth in all sections increases and sludge concentrations in all sections correspondingly rise. The section of the train where treatment occurs becomes longer. At the end of a prolonged period of a high loading rate, the entire train will be used for treatment. The effect of shortening and lengthening the section where the treatment occurs is qualitatively the same in cases of flow and concentration variations. However, quantitatively, it may differ. Increasing flow rates causes the dilute sludge wash down through lines 131, 231, 331, and 431, while increasing concentrations causes the food to flow down and the corresponding sludge growth results in transferring more concentrated sludge in the downstream stages. In either case, or a combination of these cases, the system can be designed to control the treatment process by spontaneously shortening and lengthening the treatment stretch of the process train. Therefore, there is no need for a complex process sampling, frequent or continuous on-line analyses, and process controls. Obviously the new system behavior and operation under dynamic conditions are superior as compared to the prior art systems.

Figure 2:
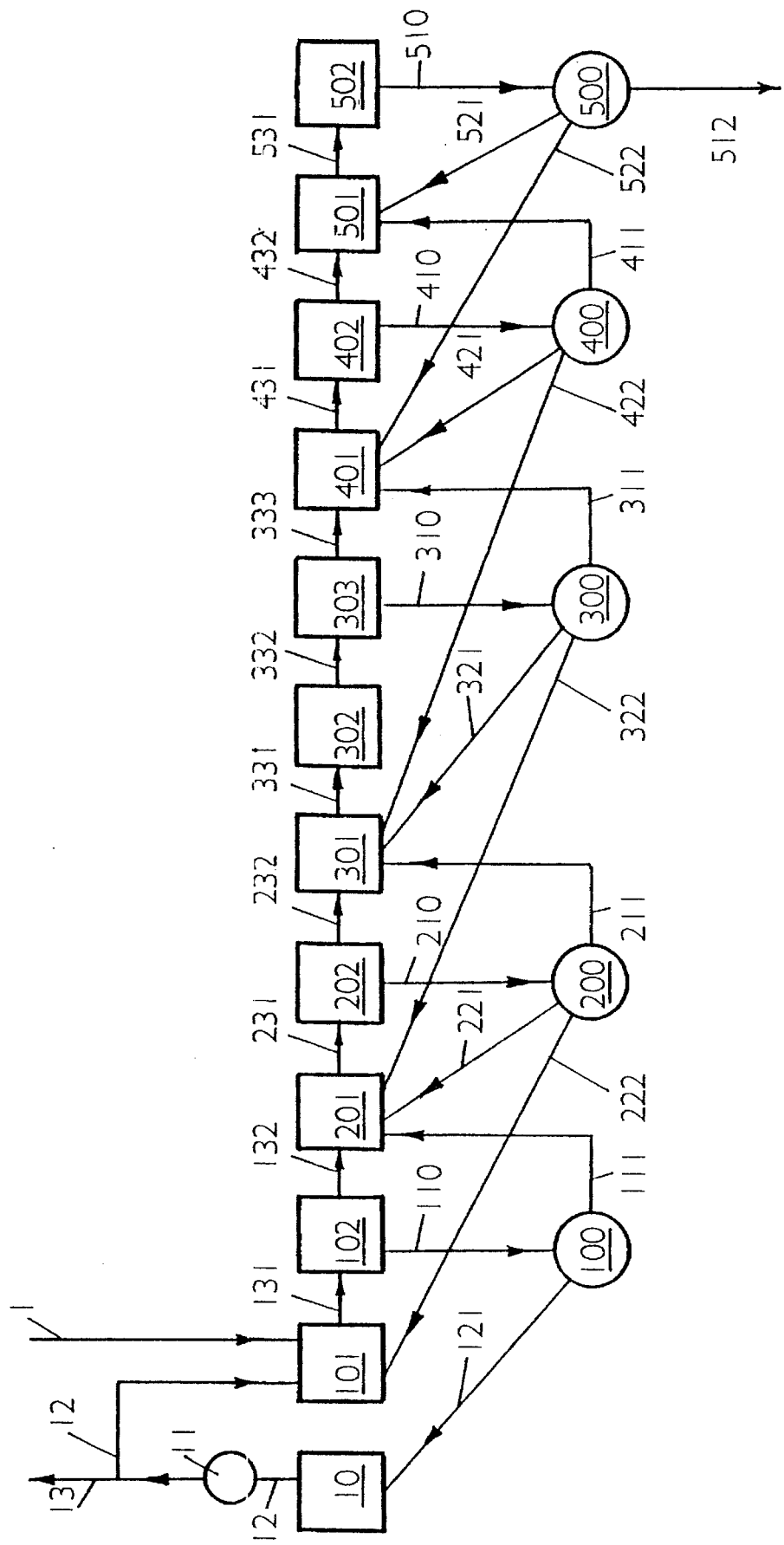
FIG. 2 is a schematic diagram showing a modified form of the process of FIG. 1, the reactors of FIG. 1 being split into a plurality of reactors.

FIG. 2 illustrates a novel system with multiple-chamber functional zones. It comprises reaction stages 101, 102 . . . , 201, 202 . . . , 301, 302, 303 . . . , 401, 402 . . . , 501, 502 . . . . Reaction stages 101 . . . , 201, 202 . . . , 301, 302 . . . and so on, represent multiple chambers in functional zones. For example, 101, 102 . . . stages may form an anaerobic functional zone, 201 . . . chambers form facultative zone, 301 . . . stages an anoxic zone. All reaction stages in all zones are connected by lines 131, 132 . . . , 231 . . . , 331, 332 . . . , 431 . . . , 531. Each zone has at least one sludge separation device 100, 200, 300, 400 and 500 connected to the last chamber in a particular zone by lines 110, 210, 310, 410 and 510. Optionally, more than one sludge separation device can be used in a functional zone. In such a case, the sludge separation device is connected to one of stages within the zone preceding the last stage. For example, it can be connected to stage 301, or stage 302, or to both. The separated water is passed downstream via lines 111, 211, 311 and 411. The separated sludge is fed back to one or several preceding stages within the same functional zone, or in the preceding functional zone. Lines 221, 222 . . . , 321, 322 . . . , 421, 422 . . . , 521, 522 . . . are provided for the sludge feed back. The influent is conveyed by a line 1, and the effluent is discharged via line 512. The sludge discharge line 121 is provided. Optionally, line 121 is used for transferring the anaerobic sludge to a sludge condition 10, which has a line 12 and a pump or other conveying means 11 for transferring part of the conditioned sludge to the anaerobic functional zone, for example, to a stage 101, and a line 13 for sludge discharge. The system is equipped with appropriate auxiliary mixing and aeration devices and other conventional means commonly found in anaerobic, facultative, anoxic, aerobic, and polishing zones. The auxiliary means are not shown in FIG. 2.

Operation of the system shown in FIG. 2 is similar to that previously described. The function and operation of the sludge condition are described in the co-pending patent application Ser. No. 08/046,788 dated Apr. 12, 1993. Functional zones provide a greater variety of microorganisms and a broader range of environmental conditions. For example, the strongly anaerobic functional zone provides strongly reducing conditions helpful for reductive dehalogenation of organics, reduction of toxic and poorly degradable organics containing oxygen, sulfur, nitrogen, phosphorous, and others not degradable aerobically. Metabolic product of the anaerobic zone, mainly fatty acids, and some original readily oxidizable organics are transferred to the subsequent zones where they are easily oxidized. The back recycle of the sludges and associated water is helpful for the repeated anaerobic-aerobic action that is applied to the original and metabolic products. This produces much greater destruction of organics. Optionally, alternating functional zones (anaerobic-aerobic-anaerobic-aerobic . . . ) may be used. Facultative and anoxic zones can also be included in the alternations.

Usually, sludges are composed of psychrophilic, mesophilic, and thermophilic microorganisms. The proportion of such organisms depends on temperature and other environmental conditions. Particularly, in media with easily degradable organics percentage of the thermophiles is high even at moderate temperature. This increases the diversity of biopopulation in the system and improves the process. Alternate exposure of the original organics and the metabolic products to the anaerobic and aerobic environments produces easily degradable constituents for both anaerobic and aerobic zones. Transfer and recycle of liquids and sludges between these zones brings a great variety of vitamins, growth substances, amino acids, and other essential constituents produced in living systems in various functional zones. This novel and useful effect is not possible in the known systems.

Figure 3:
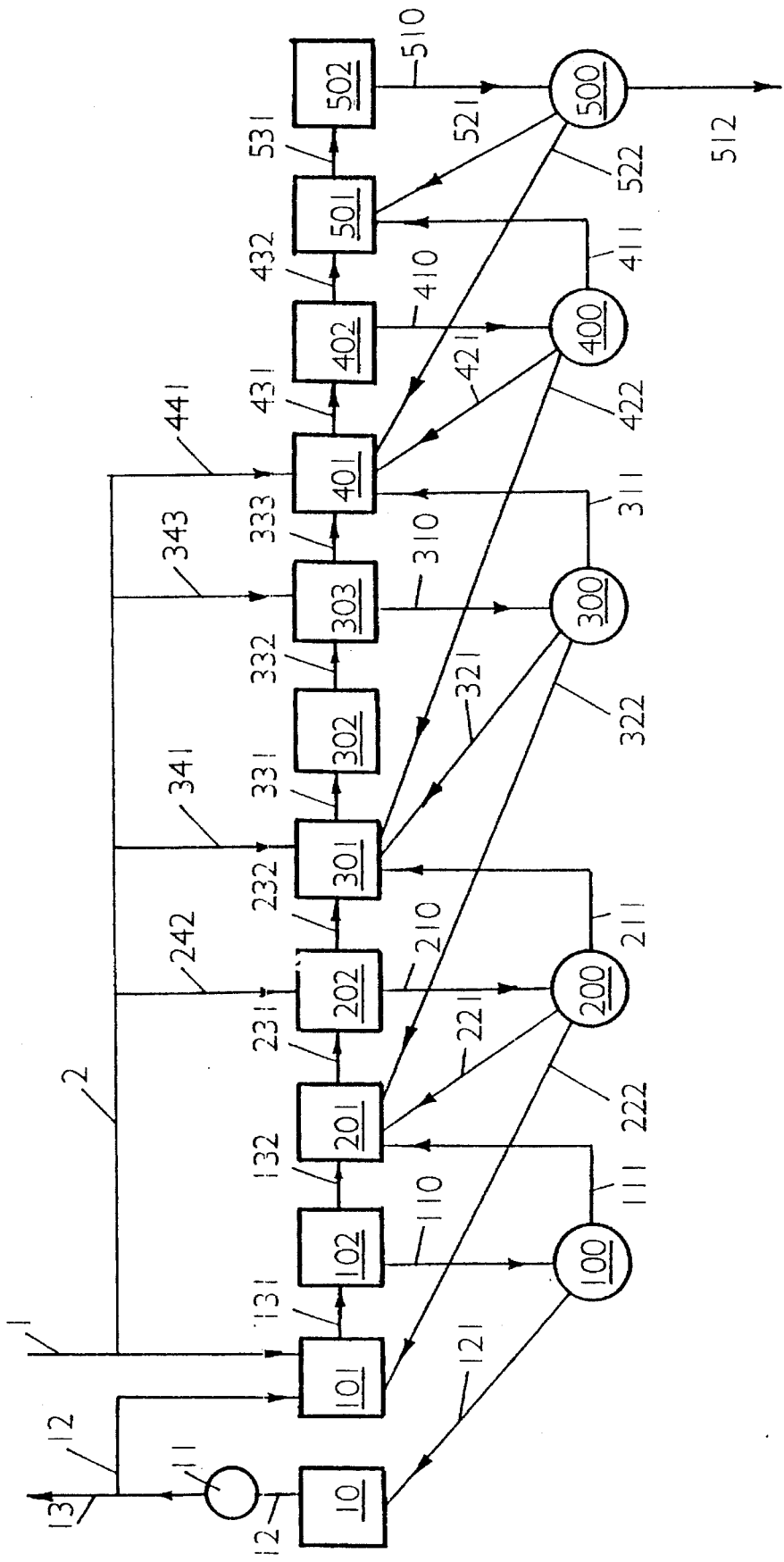
FIG. 3 is a view similar to FIG. 2 showing a distribution of the influent.

FIG. 3 is a flow chart similar to that of FIG. 2 with the additional lines 2 and 242, 341, 343, 441 . . . for distributed feed of influent in various functional zones in the system.

Distributed feed of the influent may be helpful for increasing the sludge mass in the system by providing more food in aerobic functional zones where sludge yield is greater than in anaerobic zones. Distributed feed may also be helpful in systems with alternating aerobic-anaerobic zones to provide sufficient organics supply for maintaining anaerobiosis in the downstream anaerobic zones. It can also be used as a source or organics in the anoxic zone for the reduction of nitrates and nitrites. In this embodiment, additional optimization of F/M ratios and improved biodegradability or organics are provided.

Optionally, partially treated wastewater, for example from the anaerobic functional zone, can be distributed over several downstream functional zones. For this purpose line 111 would be extended and provided with branches leading to the reaction stages 301, 401 and 501 or other intermediate stages.

Figure 4:
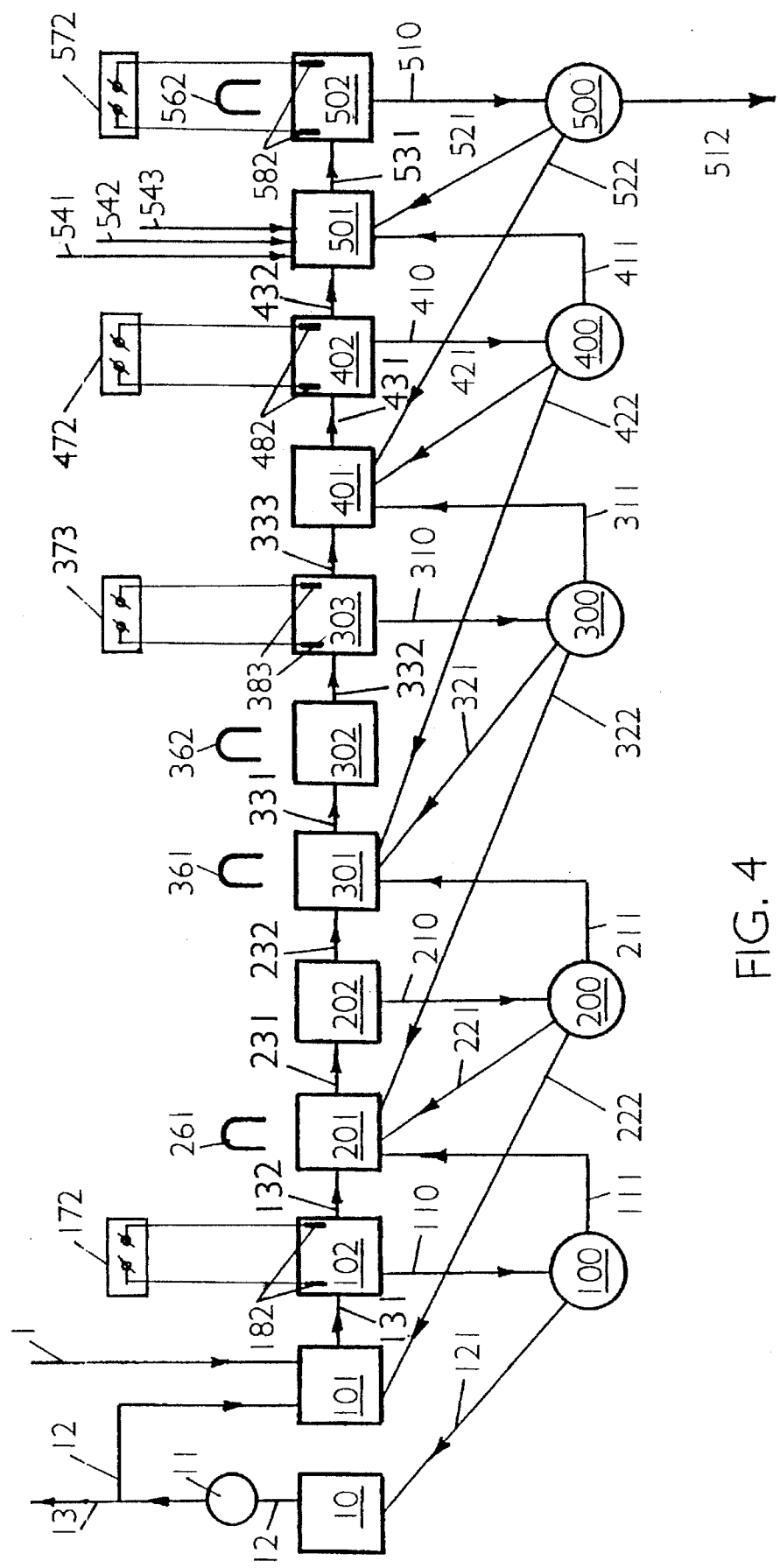
FIG. 4 is a view similar to FIG. 2 and showing treatment by electric potential and by magnetism.

FIG. 4 is a flow chart similar to that shown in FIG. 2 with additional means for physical, chemical and physico-chemical treatment combined with the previously described biological treatment.

Physical means include an electrolyzing means comprising electric current sources 172 ..., 373 ..., 472 ... 572 and electrodes 182 ..., 383 ..., 482 ..., 582. Electrodes are submerged in the reaction stages. Alternating, including industrial frequencies (50–60 Hz), or direct, or asymmetric alternating, or reversing currents, and current with back-pulses, can be applied. The sludge flocks and particles of the powdered activated carbon (see later) can be used as fluidized electrode. Application of the electric current to the biological system greatly expands the range of ORP in the reaction zones. Moreover, microzones with a wide pH range are formed in the liquid. Accordingly, many chemical, electrochemical and biochemical reactions will be effected, and/or accelerated. For example, nitrification-denitrification may be greatly improved, including the accelerated biological pathway and the chemical pathway when ammonia and nitrogen oxides react to form nitrogen and water. Sulfur formation from hydrogen sulfides and oxyions of sulfur can be accelerated. Many oxidation-reduction reactions involving toxic, poorly degradable, and recalcitrant organics can be effected.

Magnetic devices 261 ..., 361, 362 ..., 562 can be submerged in the reaction stages. Permanent magnets or electromagnets can be used. Magnetic action will accelerate biochemical reactions and promote some chemical reactions, primarily formation of the insoluble calcium carbonate. The latter are helpful for reducing the TDS of the effluent. Magnetization of mixed liquor can also reduce heavy metals in the effluent due to formation of the metal carbonates and other poorly soluble salts.

Means 541, 542, 543 ... for addition of the powdered activated carbon (PAC), coagulants, hydrogen peroxide, and other reagents can be provided. Preferably, these reagents are fed into the polishing stage or one of preceding treatment stages.

PAC in the polishing step can adsorb residual organics including toxic, poorly and slowly degradable. PAC will be separated from the liquid in the sludge separator 500 and back fed in the previous reaction stages. Gradually, PAC will be transported with the sludge in the counterflow direction to the water flow. In each reaction stage, PAC will be used as an adsorbent or organics. Adsorbed organics will be largely biologically degraded, including a substantial fraction of toxic, poorly and slowly degradable organics. Alternating anaerobic-aerobic conditions improve biological regeneration of PAC by supporting the destruction or organics that otherwise would be not degraded. Alternating anaerobic-aerobic bioregeneration of activated carbons is a significant improvement over the prior art methods (see U.S. Pat. No. 3,904,518 and No. 4,069,148). This improvement results in reducing PAC demand for treatment. Additional application of the electric current with the use of the means 172 ..., 373 ..., 472 ..., 572 to sludges loaded with PAC further improves the condition for oxidation-reduction of adsorbed organics. The use of PAC also improves the performance of the sludge separation means 100, 200, 300, 400, and 500 by forming denser and heavier sludge particles.

Conventional coagulants, for example aluminum or iron salts or their mixtures, can be used. Optionally, electrocoagulation can be used. Electrocoagulation does not increase the effluent TDS. Coagulants help to remove suspended solids, dissolved organics and phosphorus. Coagulation materials are separated with the sludge in the sludge separator 500 and are back-fed in the counterflow to the water flow. Iron ions are helpful in chemical, biological and electrochemical conversions involving sludges. In particular, iron can be oxidized to its trivalent state in aerobic process zones and reduced to it divalent stage in the anaerobic and facultative zones. Such cycling of iron is very supportive for biological and chemical oxidation-reduction reactions in the reaction stages. In the upstream anaerobic zone, iron will largely be consumed for sulfide precipitation. This will reduce the sulfide content and TDS of the liquid in the system. Both, iron and aluminum will be used in phosphorus precipitation.

Hydrogen peroxide, or ozone, or both, can be added to the polishing reaction stage for oxidation of residual organics. In the presence of the iron coagulant, hydrogen peroxide would become the Fenton reagent, a more capable oxidizer than the hydrogen peroxide itself.

Figure 5:
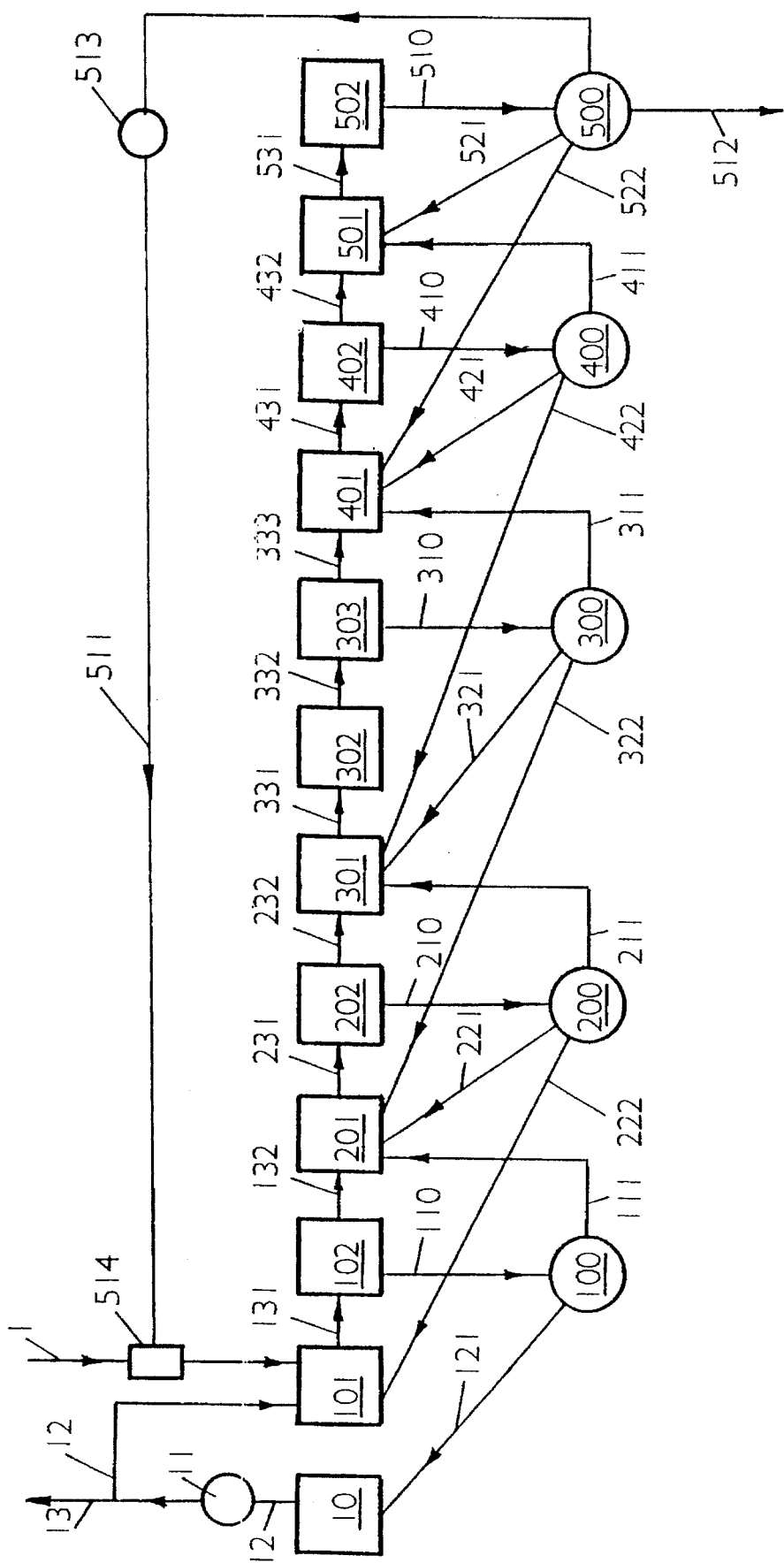
FIG. 5 is a view similar to FIG. 2 but showing a constant flow system.

FIG. 5 is a flow chart similar to that shown in FIG. 2 with the addition of an effluent recycle line 511 and a conveying means 513 for transferring part of the effluent to the influent line 1. Optionally, line 511 is connected to a flow control box 514 on the line 1 for producing a constant flow rate of liquid through the system as described in the co-pending application Ser. No. 08/046,788 filed Apr. 12, 1993.

This system modification is operated similarly to those previously described. The effluent recycle serves to dilute the excessively concentrated influent. The recycle of metabolic products exposed them to a wide range of enzymes and ORP conditions. In a system with a flow control box 514, the liquid flow rate across the system is stabilized. Accordingly, operations of sludge separation means and other portions of the system become simpler and more reliable.

Figure 6:
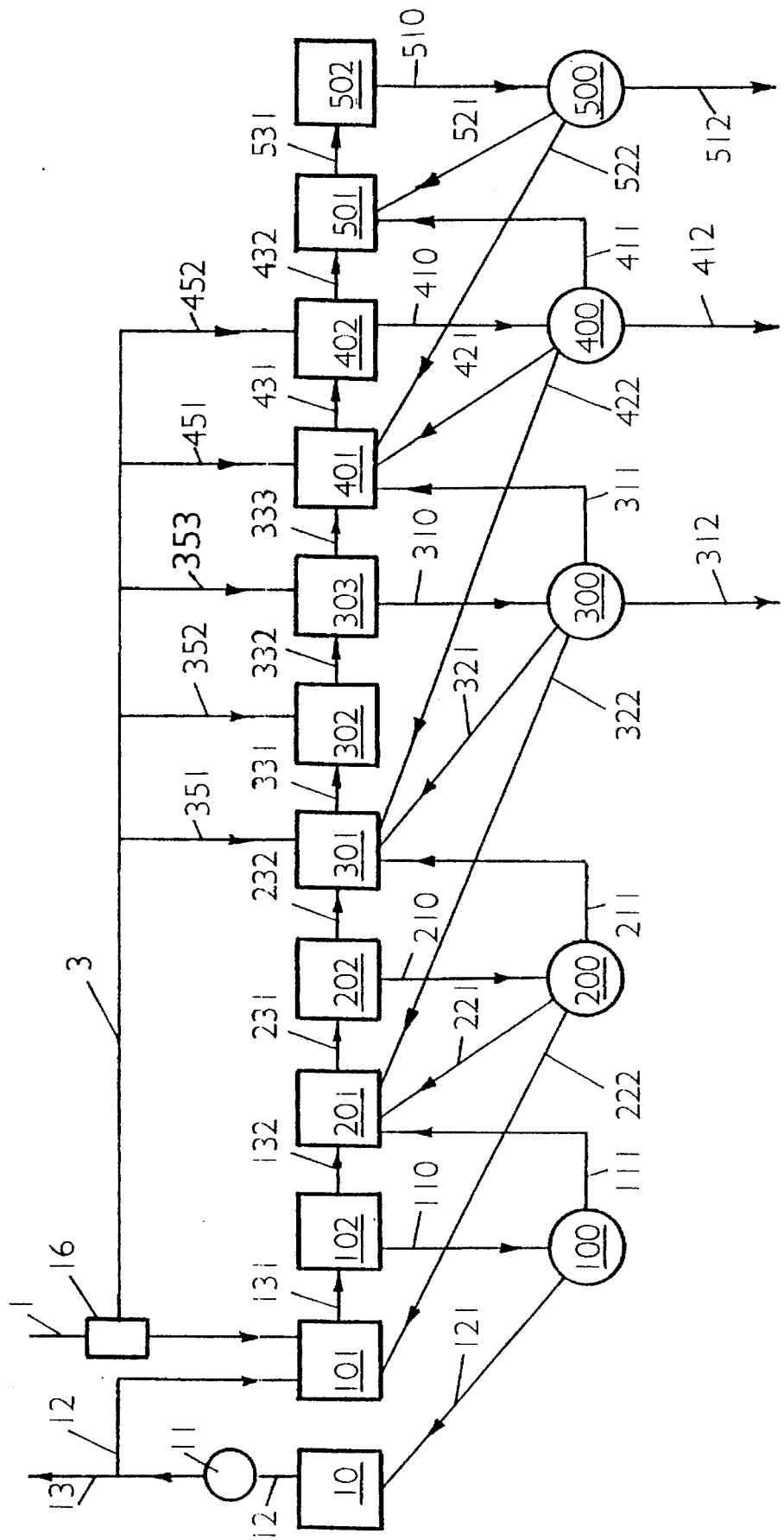
FIG. 6 is a view similar to FIG. 2 but showing modifications for use in storm situations.

FIG. 6 is a flow chart similar to that depicted in FIG. 2, with the addition of the stormwater overflow chamber 16 and additional distributed storm flow input lines 3 and 351, 352, 353, 451, 452. Optionally, distribution lines can also be provided to other reaction stages. Overflow clarified water lines 312 ..., 412 from several sludge separators in the mid-to-downstream sections of the system are also provided for the storm event flows.

In dry weather, the system is operated the same way as described for the system shown in FIG. 2. During a storm, the excess influent, above the maximum dry weather flow, is split in the chamber 16 and stages 301 ..., 402. Therefore, portions of the influent are bypassing several upstream reaction stages. However, the influent during the storm event is diluted by the storm water, is usually less polluted, and needs less treatment. Accordingly, bypassed portions will get sufficient treatment.

The use of several sludge separation devices for the effluent discharge, such as shown for units 300, 400, and 500, instead of a single separator (500 in other embodiments) increases the total hydraulic capacity of the system, thus preventing hydraulic overloading during a storm event. Additional reduction in the hydraulic loading on the sludge separators during the storm event can be achieved by temporarily closing lines 422 and 522 for sludge recycle.

Figure 7:
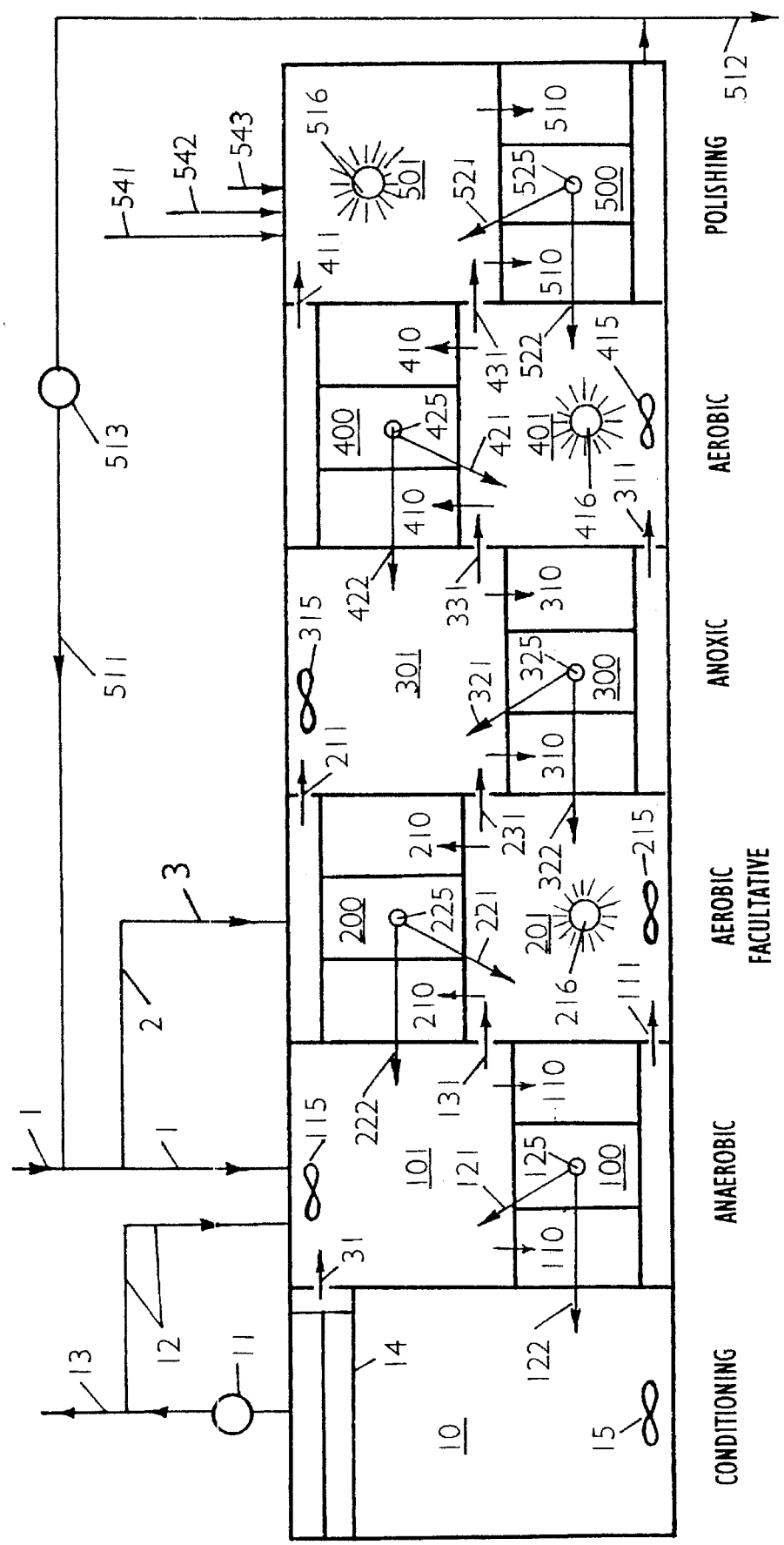
FIG. 7 is a rather schematic illustration showing an apparatus for carrying out the process illustrated in FIG. 1 of the drawings.

FIG. 7 depicts a possible layout of the novel system with counterflow of wastewater and sludges and with multiple functional zones along the process train. The system may include anaerobic, an intermittent aerobic-facultative, anoxic, aerobic and polishing zones.

An anaerobic functional zone comprises the reaction stage 101, sludge separator 100, and the sludge condition 10 with a supernatant separator 14 and a mixing means 15. The reaction stage may be any apparatus selected from an empty tank type, a fluidized bed reactor, a packed bed fixed or floating media reactor, or a biofiltration type reactor. Wastewater influent line 1 is connected to the reaction zone 101 equipped with a mixing means 115. A passageway 131 for anaerobic mixed liquor connects the anaerobic reaction stage to the downstream section of the process train. The sludge separator 100 may be any suitable means used for sludge separation: a gravity settling tank, a suspended sludge blanket clarifier (for example, such as shown in FIG. 7, see also the U.S. Pat. No. 4,472,358), a flotator, a centrifuge, or a filter. Intake passages 110 for the anaerobic mixed liquor connect the reaction stage 101 to the suspended sludge blanket clarifier 100. Conveying means 125 are provided for settled and, possible, partially compacted sludge, this means being connected to the sludge lines 121 and 122 going to the reaction stage 101 and the sludge conditioner 10. A means 111 is for transferring the clarified water to the downstream section of the process train. Line 12 and conveying means 11 are provided for transferring the conditioned sludge from the sludge conditioner 10 to the reaction stage 101. Line 13 is provided for the discharge of the conditioned sludge. The supernatant separator may also be any means for solid-liquid separation. An Imhoff settling trough is shown in FIG. 7. A passageway 31 for the supernatant connects the means 14 to the reaction stage 101.

The intermittent aerobic-facultative zone comprises a reaction stage 201 equipped with aeration means 216, mixing means 215, and a sludge separation means 200 similar to that associated with the anaerobic reaction zone. A passage 131 for the mixed liquor from the previous stage, a passage 111 for the clarified water from the previous stage, and optional raw influent feed lines 2 and 3 are connected to the reaction stage 201. Means 225 for conveying sludge and lines 221 and 222 are provided with the sludge separator 200. Passages 231 and 211 for transferring the mixed liquor and the clarified water to the downstream process stage are provided. A sludge back-feed line 322 from the subsequent stage 301 and the associated sludge separator 300 to the reaction stage 201 is provided.

The anoxic zone is similar to the intermittent aerobic-facultative zone. Major elements of this zone are the reaction stage 301 and the associated sludge separator. This zone is equipped similarly to the previous (intermittent aerobic-anaerobic) zone. An aeration device is not shown, but it can be provided. As has become clear from the previous descriptions, the aeration device, if pictured, would have been numbered 316.

The next process zone, the aerobic zone, is similar to the previous one. All equipment and connections are also similar, and the pattern of numbering of all elements is also clear from the previous description.

The last process zone, the polishing zone, is also similar to the preceding zones. It also includes two major elements: the reaction stage 501 and the sludge separation stage 500. Similar equipment is also shown in the drawing. An optional mixer may be provided in the reaction zone 501. Additionally, the reagent feed lines 5641, 542, 543 . . . are provided for pH control, for coagulants, polymers, PAC, hydrogen peroxide, etc. The line 512 for the effluent from the sludge separator in this zone is provided. An optional line 511 with conveying means 513 connects the effluent line 512 to the influent line 1. An optional flow control means 514 as shown in FIG. 5 may also be provided.

Other features, such as those shown in FIGS. 1 through 6, may be included in the system presented in FIG. 7.

The system of FIG. 7 is operated as follows: The influent is fed via line 1 into the reaction stage 101 of the anaerobic functional zone. In the reaction stage 101, organic particles in the influent are partially solubilized by the hydrolyzing microorganisms, the soluble organics thus formed and those originally present in the influent are at least partially converted into fatty acids by the acidogenic organisms, and the fatty acids are at least in part converted into methane by the methanogenic organisms. Simultaneously, carbon dioxide, hydrogen, hydrogen sulfide and ammonia will be formed. During these conversions, the named groups of organisms propagate and grow. To improve the process rate, provide good destruction of suspended solids and increase the process stability, the sludge formed in the reaction stage 101 is conditioned in the sludge conditioner 10.

The mixed liquor containing particles of biological sludge formed by these organisms is transferred into the suspended sludge blanket clarifier 100 through passages 110. The settled and, possibly, compacted and densified sludge is taken by the conveying means 125 and is transferred with the help of the conveying means 125 via line 122 into the sludge conditioner. Some nonconditioned sludge may be recycled to the reaction stage 101 via line 121.

The effects produced by the sludge conditioner are described in the co-pending patent application Ser. No. 08/046,788 dated Apr. 12, 1993. Supernatant may be separated in unit 14 from the sludge being conditioned and transferred to the reaction stage 101 via passage 31. The conditioned sludge is recycled to the reaction stage 101 via line 12 by means 11. Part of the conditioned sludge is discharged via line 13. The contents of the reaction stage 101 and the sludge conditioner 10 are mixed by the mixers 115 and 15. The wastewater in the anaerobic zone is at least partially treated. Organic content is reduced at least partially, while poorly and slowly degradable and toxic organics are removed and destroyed. Nitrates and nitrites fed with the recycled effluent, if any, are reduced to nitrogen and water. Sulfur in sulfur-containing compounds, organic or mineral, is reduced to hydrogen sulfide. A fraction of hydrogen sulfide is used to precipitate heavy metals, some sulfides react with nonreduced sulfate and incompletely reduced sulfite to form elemental sulfur, and some sulfides are spent to reduce the nitrates and nitrites to nitrogen and sulfur.

The mixed liquor from the anaerobic functional zone, the clarified effluent from the clarifier associated with the anaerobic functional zone, and, optionally, part of the influent, are fed into the intermittent aerobic-facultative zone through lines and passages 131, 111, and 2 and 3. The sludge separated in the anoxic functional zone is also fed into this zone. The contents of the zone are periodically aerated by means 216 and mixed by means 215 during the balance of the time. Part of the aerobic-facultative sludge is recirculated from the sludge separator 200 with the help of means 225 via line 221. Accordingly, the wastewater constituents are subjected to the action of aerobic and facultative organisms. During facultative period, biological processes involve destruction of organics, growth of facultative anaerobes, suppression of the filamentous growth, and phosphorus release from the sludge. During aerobic period, the biological processes involve microbial growth, destruction of organics, and phosphorus uptake. Depending on the loading rates, total retention time, and time split between aerobic and facultative periods in the aerobic-facultative zone, nitrification may occur during the aerobic period. In such a case, denitrification will occur during the facultative period.

The mixed liquor and the clarified water from the intermittent aerobic-facultative zone are fed to the anoxic zone via passages 231 and 211, and separated sludge from the aerobic functional zone is fed via line 422. The content of the zone is mixed by means 315. Part of the anoxic sludge is recirculated from the sludge separator 300 with the help of means 325 via line 321. Nitrates and nitrites generated in the aerobic functional zone and transferred with the separated sludge to the anoxic zone are reduced with the simultaneous oxidation of organics. It should be stressed that oxidation-reduction reactions, chemical or biochemical, with participation of nitrates and nitrites occur at higher ORP values than with the participation of the molecular oxygen. Accordingly, poorly and slowly degradable organics that cannot be oxidized in conventional aerobic processes become degraded.

The mixed liquor and the clarified water from the anoxic functional zone are fed into the aerobic functional zone (reaction stage 401), via passages 331 and 311, and separated sludge from the polishing zone (reaction stage 501), is backfed into the aerobic functional zone through the line 422. Part of the aerobic sludge is recirculated from the sludge separator 400 with the help of means 425 via line 421. Aerobic oxidation of organics and growth of aerobic organisms occur in this functional zone. Additionally, the excess of nitrogen over that required for the biomass growth is oxidized into nitrite and nitrate.

The mixed liquor and the clarified water from the aerobic functional zone are fed into the polishing functional zone (reaction stage 501), via passages 431 and 411. The volume of the reaction stage 501 is aerated and mixed by means 513 and 515 (not shown). In aerobic environment at low organics and activated sludge concentrations the effluent is polished: BOD and COD, and specific organics are additionally removed and residual nitrogen is oxidized. Because concentrations of organics and sludge are low, the secondary pollution of the effluent by the products of die-off and lysis is minimized. Unlike conventional systems, organics of the "internal bacterial juices", phosphorus, nitrogen and heavy metals are not emitted in the water in noticeable quantities.

Figure 8:
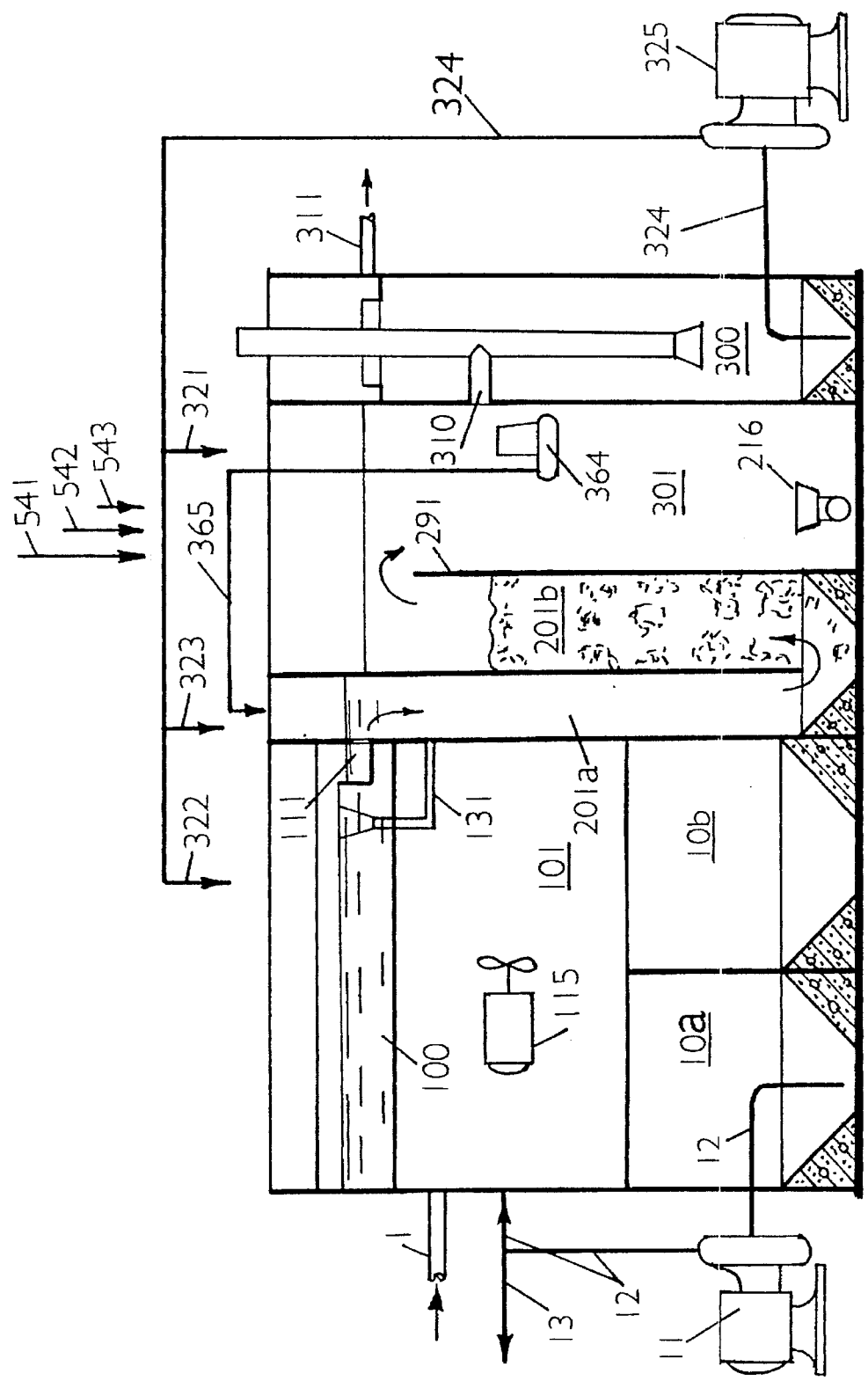
FIG. 8 is a rather schematic showing of a modified form of apparatus for carrying out the process of the present invention.

FIG. 8 illustrates another possible layout of the present system. The system comprises the anaerobic reaction stage 101 disposed above multiple sludge conditioning sections, or compartments, 10a, 10b, etc. There is a combined reaction-sludge-separation stage 201 made of two sections, 201a and 201b, and a reaction stage 301 with a sludge separator 300.

The anaerobic reaction stage and sludge conditioning sections are equipped with a sludge separation device 100, such as an Imhoff trough, having an outlet 111, a mixing means 115, means 131 for transferring the mixed liquor, influent feed pipe 1, and line 12 for sludge recycle from the sludge conditioners to the anaerobic reaction stage 101 with a pump 11, and a line 13 for sludge discharge. Line 12 is conditionally shown only in compartment 10a, however, it is provided in all sludge conditioning compartments.

The combined reaction-sludge-separation stage 201 consists of two sections: a downflow section 201a and an upflow section 201b. These sections are hydraulically connected via opening 290. The top of the wall 291 separating section 201b from the reactor stage 301 is submerged under the water level. Section 201b is a fixed bed upflow filter with a stone, plastic or other medium. Optionally, section 201b may be partially filled with a fluidizable media, such as sand, granular activated carbon, crushed porous baked clay (ceramsite) or other suitable medium. The fluidizable mediums is preferred in cases when a risk of plugging the fixed medium exists. Adsorption media, such as carbon, or attached biomass, constitute an active material in the bed.

The reaction stage 301 is equipped with aerators 216, and a means 364 for transferring mixed liquor from the reactor stage 301 via line 365 to the section 201a. Means 541, 542, 543, etc. are provided for the optional feeding of the powdered activated carbon (PAC), coagulants and other reagents listed in the previous discussions. An optional extension of line 365 may be provided for backfeeding the mixed liquor from the stage 301 to the stage 101. Pipe 310 connects the reaction stage 301 to the sludge separator 300. The clarified water from the separator is removed via line 311, and the separated sludge is withdrawn from the separator's bottom via pipe 324 with a pump 325, and transferred to the reaction stages 301, 201a and 101 through lines 321, 323 and 322 respectively.

The system is operated as follows. Wastewater is fed into the anaerobic reaction stage 101 and is mixed by the mixing device 115 with the anaerobic sludge grown in this stage and conditioned in the sludge conditioner 10. Some conditioned sludge is recycled via line 12 by a pump 11. The balance of the conditioned sludge is discharged via line 13. Mixed liquor is partially clarified in the sludge separator 100 with the sludge falling back into the reactor stage 101, and the clarified water being discharged to the reaction stage 201 via opening 111. The balance of the mixed liquor is transferred to the reaction stage 201 via line 131. Biological and other processes in the anaerobic functional zone are described in the co-pending patent application Ser. No. 08/046,788, dated Apr. 12, 1993. Organics in the clarified wastewater and the mixed liquor after the anaerobic stage are represented mostly by easily degradable fatty acids and other simple compounds. Only a small proportion of the constituents in this stream are poorly degradable and toxic and recalcitrant organics.

The clarified water and mixed liquor from the anaerobic stage and the mixed liquor from the aerobic stage 301, and optionally, separated sludge from the separator 300, are fed to the downflow section 201a of the reaction stage 201. The flows from the stage 301 via pipe 365 and from sludge separator 300 via lines 321, 322 and 323 may carry substantial quantities of nitrates and nitrites. From the downflow section 201a, the mixture of waters and aerobic and anaerobic sludges is directed through opening 290 into the upflow section 201b. For the purposes of discussion, it is assumed that the section is filled with GAC. Operation of this section with other fluidizable material or with a fixed bed is very similar. The GAC layer is fluidized by the upflow. GAC is retained in the section 201b, while the lighter biological sludge, with or without PAC, is passing through the section 201b and is fed into the reaction stage 301 over the wall 291. PAC and biomass, or their combination, constitutes a second active material in the reaction zone. The combined sludge in the section 201b is composed of aerobic and anaerobic organisms. The biomass attached to the GAC particles is predominantly anaerobic, while that attached to the PAC particles is aerobic. Therefore, enzymes originated in aerobic and anaerobic environments simultaneously act upon and degrade organics, including residual quantities of recalcitrant and toxic compounds. Moreover, nitrates and nitrites are reduced be denitrifying organisms to nitrogen and water. Some nitrites and nitrates will be reacting with poorly degradable, recalcitrant and toxic organics. Optionally, nitrates and nitrites may be added in the section 201a or at the bottom of the section 201b to increase the effect of oxidation of such organics. Chemical reaction between ammonia and ammonium ions, and sulfide and sulfide ions on one hand and nitrites and nitrates and sulfites and sulfates result in formation of nitrogen and sulfur.

The stage 201 described in this embodiment is a novel reaction-separation method and device in which part of the sludge is retained (grown and immobilize) on the GAC, and another portion is passed through with the PAC (or in form of biological flock found in usual sludge). Optionally, the fluidized bed may be formed by a granular anaerobic sludge grown with PAC. The adsorption capacity of either GAC, or granular sludge with PAC is regenerated biologically using active agents associated with aerobic and anaerobic sludges simultaneously present in the system.

Aerobic biochemical processes occur in the reaction stage 301, possibly with the nitrification. The nitrogen control in the effluent is provided by chemically reacting ammonia and nitrites and nitrates and biological reduction of nitrates and nitrites in the reaction-separation stage 201. Phosphorus control is provided by partial biological uptake and by addition of iron and aluminum coagulants to the reaction stage 301.

Figure 9:
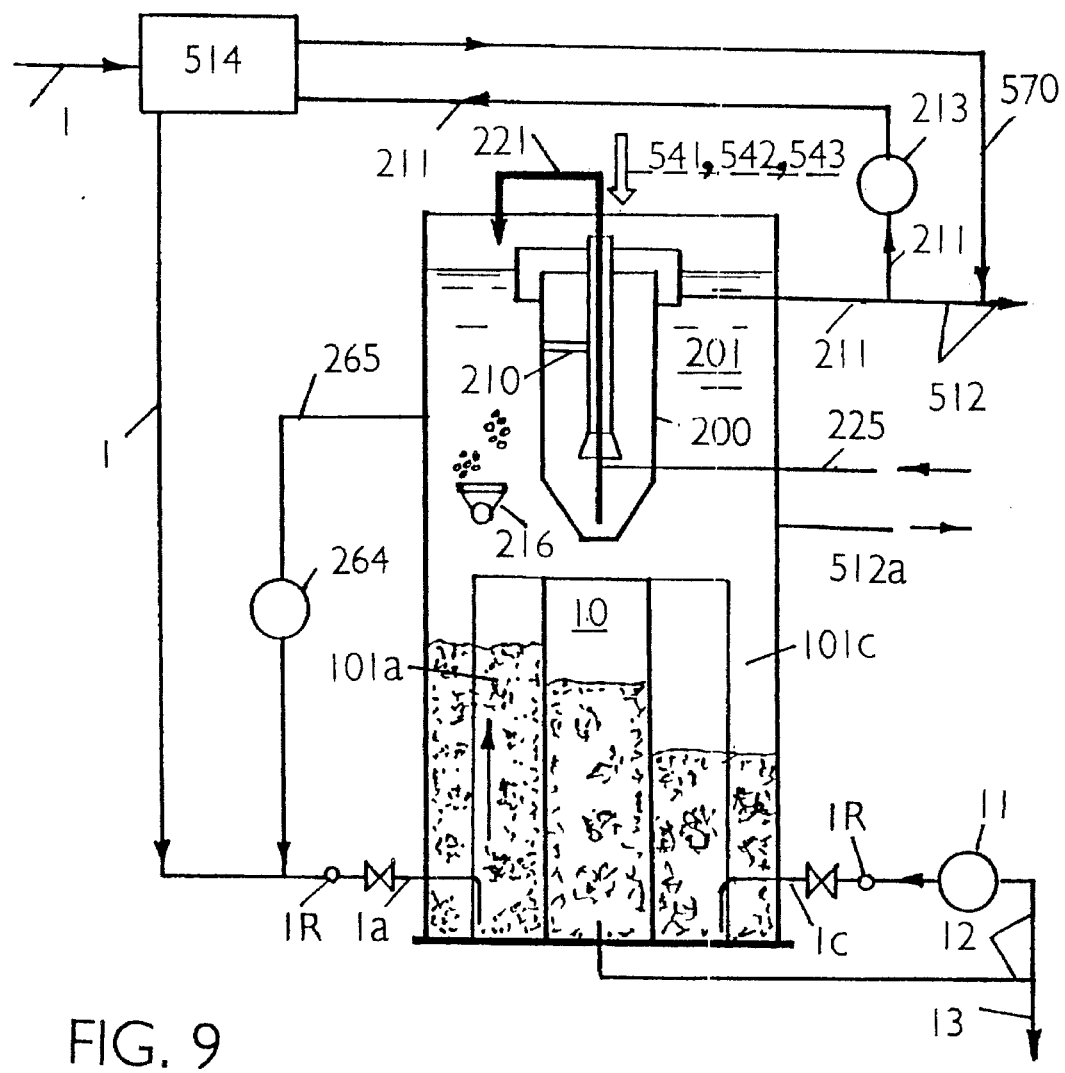
FIG. 9 is a view similar to FIG. 8 but showing a modified form of apparatus.
Figure 10:
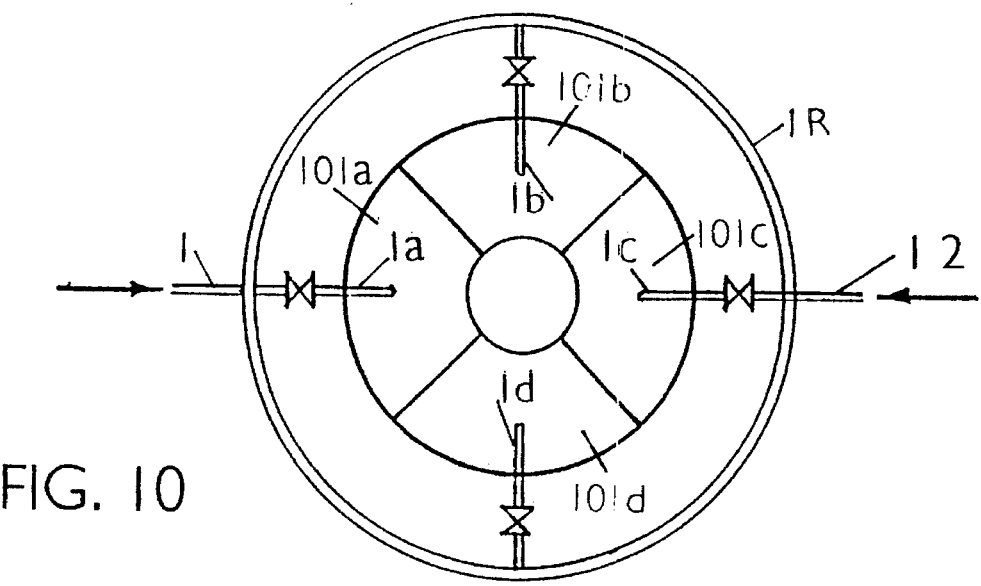
FIG. 10 is a cross-sectional view taken substantially along the line 10—10 in FIG. 9.

Referring now to FIGS. 9 and 10, there is shown an alternative apparatus for practicing the method of this invention. The apparatus consists of an anaerobic reaction stage 101 made of several compartments 101a, 10b, etc., an anaerobic sludge conditioner 10 located centrally relative the said anaerobic compartments 101, an aerobic reaction stage 201 disposed above the anaerobic compartments 101 and the sludge conditioner 10, and a sludge separator 200 located in the upper section of the aerobic reaction stage 201.

The anaerobic compartments 101a, 101b, 101c, etc. can be a free volume section with a fluidized granular anaerobic sludge, or, optionally, be loaded with fluidizable coarse bed media such s sand, granular activated carbon, or crushed packed porous clay (ceramsite) or they may have a fixed bed of stone or plastic contact medium or other packing type. Granular anaerobic sludge with or without PAC can also be used as a fluidizable material. The aerobic reaction zone 201 can optionally be packed with a support material providing the attached growth as in submerged biofilters. The aerobic stage is equipped with aerators 216. Feed line 1 for the influent is connected to a constant flow box 514, this line continues downward and is connected to a ring pipe 1R having branches 1a, 1b, 1c, etc. with valves for each anaerobic compartment 101a, 101b, 101c. etc. A line 265 with a pump 264 connects aerobic stage 201 to the anaerobic compartments 101 via lines 1, 1R and branches 1a, 1b, 1c, etc. Line 12 and pump 11 connect the bottom part of the sludge conditioner via the ring pipe 1R and branches 1a, 1b, 1c, etc. to the bottom part of the anaerobic compartments 101a, 101b, 101c, etc. Pipe 13 is the sludge discharge. Pipe 210 connects the volume of the aerobic stage 201 to the separator 200, which is shown here as a vertical flow clarifier. An airlift 225 is installed in the clarifier 200 and is connected to a pipe 221 for transferring the separated sludge to the aerobic reaction stage 201. Pipe 211 further connected to pipe 512 is provided at the clarifier 200 of the effluent discharge. The effluent recycle pipe 211 with a pump 213 connects the effluent pipe 211 to the constant flow box 514. An overflow pipe 570 connects the said box 514 to the effluent line 512. Means 541, 542, 543, etc. for feeding various reagents as previously described are also provided. These means may be attached to feed said reagents to either aerobic reaction stage 201 or anaerobic compartments 101.

The system is operated as follows. The wastewater influent and the recycled effluent are fed via lines 1 and 211 into the constant flow box 514. The constant flow of the influent and recycled effluent mixture produced by the box 514 is fed via lines 1, 1R, and 1a, 1b, 1c, etc. into the selected compartments 101a, 101b, 101c, etc. A recycled flow of the mixed liquor from the aerobic reaction compartment 201 is fed into the anaerobic compartments 101a, 101b, 101c, etc. by the pump 264 via line 265. One or several compartments can be selected by opening or closing valves on branches 1a, 1b, 1c, etc. The upflow streams fed into the selected anaerobic compartments fluidize the bed of biological sludge, or the bed of the coarse material supporting the sludge (sand, GAC, ceramsite). The original organic materials and metabolic products from the aerobic reaction stage 201, including nitrates and nitrites, are anaerobically converted in the compartments 101 forming anaerobic biomass, methane, carbon dioxide, hydrogen, sulfides, nitrogen, and residual fatty acids and other organics, including residual poorly degradable and toxic constituents. If GAC is packed in compartments 101 and PAC is added to the mixed liquor, preferably in the aerobic reaction stage 201, the processes occur in the manner as described above. This anaerobic stage converts organics and inorganics, including nitrogen removal. Recycle via line 265 provides a repeated (alternating) anaerobic-aerobic treatment or organics and metabolic products. The suspended solids and some organics are coagulated and flocculated by both the aerobic sludge brought in via recycle pipe 265, and the conditioned anaerobic sludge fed via lines 12 and 1a, 1b, 1c, etc. and the anaerobic sludge cultivated in the compartments 101. The process can further be improved by applying previously described physical, physical-chemical and chemical actions to the anaerobic system in compartments 101.

The mixed liquor leaving the selected compartments 101 enters an area below the aerators 216 and above the top of compartments 101. Here, part of the sludge settles down by gravity into the sludge conditioner 10, and onto the top of compartments 101 that are not selected at the time. Anaerobic sludge is conditioned in the sludge conditioner as previously described. Part of this sludge is recycled to the anaerobic reaction compartments 101, and the balance is discharged through the line 13. The liquid flow from the selected anaerobic compartments 101 with residual organics and with the residual suspended solids enters the aerobic reaction stage, is subjected to the aerobic treatment with corresponding organics removal, suspended solids coagulation-flocculation by the sludge, nitrification, and partial phosphorus removal due to the microbial uptake, Coagulants and flocculants can be added to improve the sludge settlability and for removal of phosphorus. PAC and other reagents an also be used with the benefits previously described. If the optional support medium is provided, an attached growth of aerobic biomass will occur. It will improve nitrification-denitrification in the aerobic reaction stage 201. The anaerobic gases will cross the aerobic reaction stage 201 and become treated. Thus, hydrogen sulfide will be partially oxidized to the sulfite and sulfate, and partially converted to sulfur. Ammonia will react with nitrites and nitrates to become nitrogen. Organic gases will be mostly absorbed and aerobically metabolized. Methane will be partially absorbed, metabolized by methanotrophic bacteria and support eh growth of such bacteria. This is very useful for co-metabolizing the chlorinated organics. The aerobic mixed liquor is fed in the clarifier 200 through pipe 210, precipitated to the bottom of the clarifier, and recycled back to the aerobic reaction stage via airlift 225 and pipe 221. The clarified water is evacuated at the top of the clarifier via line 211. Part of the clarified water is discharged by line 512 and the balance is fed by pump 213 via line 211 to the constant flow box 514. The excess recycle flow is discharged by line 570 to the effluent discharge line 512. The aerobic sludge is partially circulating in the aerobic reaction stage 201, is partially pumped through the anaerobic compartments 101 by line 265 and pump 264, and partially precipitates to the anaerobic sludge conditioner 10. Regardless of the pathway, all aerobic sludge is transferred to the previous, anaerobic stage.

Modifications to the system presented by FIGS. 9 and 10 may include multiple sludge conditioning zones, a single upflow reaction zone, the use of a downflow fixed bed reaction zone instead of the upflow reaction zone, additional polishing zone, for example, a chemical-biological treatment in a biofilter with the addition of PAC and coagulants for the purposes as previously described.

The system depicted in FIGS. 9 and 10 can also be used as a sequencing batch reactor with anaerobic-aerobic cycles. In bath mode, the sludge separation means 200 is not required, and an alternative discharge line 512a for the effluent is provided.

The batch system is operated as follows: At the beginning of the cycle, the liquid level in the reactor is at the level of pipe 512a. Gradually, the reactor is filled and the liquid is pumped by pump 264 through selected compartments 101, thus undergoing initial anaerobic treatment. Aerobic sludge originally placed on the top of the anaerobic sections 101 is also involved in the anaerobic cycle. Later, the filling continues and aeration starts. Now, partially treated aerobically, wastewater is recycled through compartments 101. This constitutes alternating anaerobic-aerobic treatment. After complete filling and additional aeration and anaerobic-aerobic recycle, the treated wastewater is allowed to separate from the settling sludge. Separated water is decanted. The aerobic sludge remains on top of anaerobic compartments. A potion of anaerobic and aerobic sludges is conditioned in sludge conditioner 10. Conditioned sludge is recycled and periodically discharged from the system. Optionally, a portion of the reaction compartments 101 may be aerobic. In such a case, aeration means can be provided in these sections.

The system given in FIGS. 9 and 10, either flow-through or batching, can also be used for sludge digestion.

Figure 11:
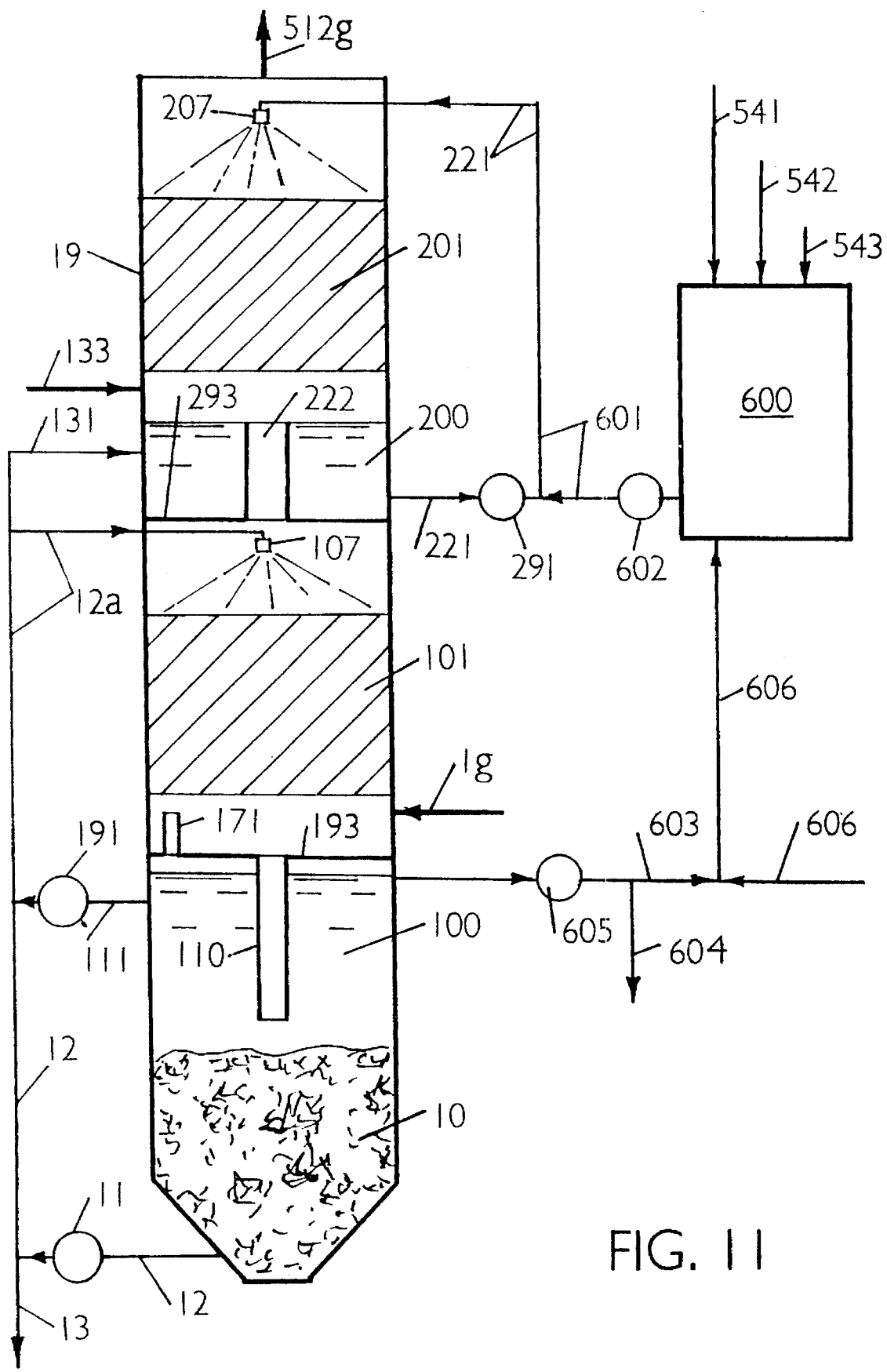
FIG. 11 is a rather schematic view showing another form of apparatus for carrying out the process of the present invention.

Referring now to FIG. 11, there is shown a system for treatment of gases bearing biodegradable constituents, either in gaseous or particulate form, or both. The system consists of two biological reaction stages: anaerobic stage 101 and aerobic stage 201. Each stage can be made as a biofiltration section, or a packed scrubbed. Sludge separators 100 and 200 may be associated with each reaction stage. Gravity separators disposed under the reaction stages are shown in FIG. 11, however, other known separation means as listed above can also be used. A bottom section of the apparatus may be assigned for an optional sludge conditioner 10. As shown in FIG. 11, the entire apparatus, with exception of auxiliary elements, is assembled in a single column 19, but other arrangements can also be used. The sludge separator 201 is formed by a tray 293, the wall of the column 19, and the wall of the passage 222. The sludge separator 100 is formed by the wall of the column 19, a tray 193 with a pipe 171 for passing gases upstream, and a passage 110 for the mixed liquor. A gas influent line 1g is connected to the bottom section of the reaction stage 101. Line 221 with a pump 291 connects the sludge separator 200 to the top of the reaction stage 201. A means 207, for example a spraying device, is attached to the end of pipe 221 at the top of the reactor stage 201. Lines 111 and 12a with a pump 191 connect a sludge separator 100 to the top of the reaction stage 101. A liquid distribution means 107, for example spraying heads, is attached to the end of pipe 12a at the top of the reaction stage 101. Lines 12 and 12a connect the sludge conditioner 10 to the spraying device 107. A branch 131 connects the pipe 12a to the sludge separator 200. Line 13 for sludge discharge is attached to line 12. Line 603 is connected to the sludge separator at its top. This pipe with a pump 605 and the fresh water feed pipe are connected to a tank 600 (or several tanks) for reagents. A branch pipe 604 is equipped with reagent feeders 541, 542, 543, etc., for example, for PAC, coagulant salts, supplementary organics, etc. Tank 600 is connected to the line 221 by a pipe 601 with a metering pump 602. A line 133 for oxygen-containing gas (air, or oxygen, or both) is connected to the bottom of the reaction stage 201. Pipe 512g for discharging the treated gas is attached to the top of the reaction stage 201.

This system is operated as follows; The polluted gas is fed at the bottom of the reaction stage 101 via line 1g and flows upward across the packing. Conditioned anaerobic sludge from the sludge conditioner 10 and a clarified, or partially clarified anaerobic supernatant from the top of the sludge separator are fed by pumps 11 and 191 via lines 12, 111, and 12a to the top of the reaction stage 101 and sprayed over the reactor packing by a spraying device 107. The sprayed mixture of anaerobic sludge and supernatant come into contact with the gas fed into the reaction stage 101 and scrub and absorb a fraction of the pollutants from the gas. Biological growth in the reaction stage 101 occurs on the packing (attached growth) and in the suspension. Hydrolyzing, acidogenic and methanogenic microorganisms are grown in the reactor stage 101. Other specialized groups of organisms are also present, particularly sulfate reducers. Organic particulates scrubbed in this reactor are at least partially solubilized by the hydrolyzing organisms, soluble materials are at least partially converted into fatty acids and carbon dioxide, methane, hydrogen, ammonia, and hydrogen sulfide by the acidogenic and other organisms, and fatty acids are at least partially converted into methane and carbon dioxide by the methanogens.

After passing across the packing in the reaction stage 101, the mixed liquor is collected on the tray 193 and flows into the sludge separator 100. The clarified water in the separator is collected at the top and is partially recycled by pump 191 via lines 111 and 12a to the top of the reaction stage 101, and to the reaction stage 201. The balance of the clarified water is discharged to the tank 600 by pump 605 via lines 603 and 606 for reagent preparation. A fraction of this stream may be periodically or continuously discarded via line 604. Make-up water is added to the system through the line 606. The settled sludge goes to the sludge conditioner 10 by gravity. Scrubbed particulates and incompletely digested soluble organics are additionally digested and converted to the final products of anaerobic processes. The gases generated in the sludge conditioner pass through the sludge separator 100, become collected under the tray 193 and released to the reaction stage 101 via pipe 171.

The conditioned sludge is recycled by pump 11 through lines 12 and 12a to the top of the reaction stage separator 200. A portion of the conditioned sludge is discharged continuously or periodically through line 13. After the first stage treatment, the feed gas is transferred through opening 222 to the reaction stage 201 (second treatment stage). At the bottom of this stage, the feed gas is mixed with oxygen-containing gas fed via line 133. The gas mixture flows upward across the packing in the reaction stage 201 and contacts the downflowing aerobic mixed liquor. This mixed liquor is recycled by the pump 291 via lines 221, and distributed over the packing means 207.

Attached and suspended aerobic microorganisms are growing in the reaction stage 201. Residual organics, volatile metabolic products from the previous stage, and ammonia and hydrogen sulfide are additionally absorbed, and removed from the gas by the biomass and water. The bulk of the biodegradable materials are oxidized to carbon dioxide and water, ammonia is partially converted to nitrates and nitrites, sulfides are partially oxidized to sulfites and sulfates. Nitrogen and sulfur are partially formed through the chemical reactions between ammonia, sulfides, and nitrates and nitrites, and sulfites and sulfates. Nitrogen leaves the system with the treated gas via pipe 512a, and sulfur is eventually discharged with the anaerobic sludge. Some mixed liquor overflows through the opening 222 to the reaction stage 101. This constitutes a counterflow of the sludge in the system overall. Moreover, nitrates and nitrites carried down to the reaction stage 101 are used up for oxidation of organics in this stage.

Additional reagents may be placed into the system by the use of tanks such as tank 600 with the metering pump 602 and lines 601 and 221. Addition of PAC results in adsorption of pollutants from the gas, thus increasing the process rate and efficiency. The PAC will take part in the sludge counterflow and will be used in aerobic and anaerobic reaction steps as previously described. Other reagents can also be used as previously described for the wastewater treatment applications. A specific reagent, source of carbon, or organics, may be needed in the gas treatment systems to improve the process stability at highly variable, and periodic gas loading conditions, or for gases carrying poorly degradable organics. Preferably, nonvolatile organics should be used. Wastewater may also be used as a source of organics. Optionally, electromagnetic fields can be applied to reaction stages in the gas treatment system similar to the described wastewater treatment system.

The embodiments illustrated in FIGS. 1 through 11 show that various arrangements, including novel apparatuses, for producing unexpected useful effects in the biological treatment of streams loaded with organics can be used. The novel system may be used for treatment of wastewater, waste and other gaseous streams, solid waste, such as municipal garbage, commercial, industrial and agricultural waste, fossil fuels, and possible other materials, These material can be treated the same way as wastewater in a slurried form, or in contactors such as described for gas treatment, or in apparatuses as described or in apparatuses for handling dry (moistened) materials. In either case, flow patterns and environmental conditions of treatment process will be analogous to those described in this application. It will therefore be understood by those skilled in the art that the particular embodiments of the invention here presented are by way of illustration only, and are meant to be in no way restrictive; therefore, numerous changes and modifications may be made, and the full use of equivalents resorted to, without departing from the spirit or scope of the invention as outlined in the appended claims.

I claim:

1. A method for the multi-stage biological treatment of an influent material, wherein the said influent material is processed in a plurality of sequential reactors having contents of mixed liquor, said method comprising the steps of:

1) dividing said mixed liquor in said reactor into two portions;
   2) directing one of said portions for separating said mixed liquor into biomass and clarified water;
   3) directing said clarified water separated from said biomass to at least one subsequent reactor;
   4) directing more than an excess of said biomass separated from said clarified water to a previous reactor; and
   5) directing the other portion of said mixed liquor from step 1) to a subsequent reactor, wherein in the first reactor, the said separated biomass, limited to excess biomass, is discharged, and in the last reactor, the entire amount of the said mixed liquor is separated into biomass and clarified water and the biomass is directed to a previous reactor, whereby a counterflow is established with the predominant flow of said mixed liquor being downstream and the predominant flow of said biomass being upstream.

2. A method as claimed in claim 1, wherein said influent material is selected from the group consisting of water, wastewater, aqueous industrial and production streams, industrial and production gases, gaseous and vent emissions, solid waste, solid raw materials, fossil fuels, and solid industrial and production streams.

3. A method as claimed in claim 1, having et least two stages, wherein each of the said stages is selected from the group consisting of anaerobic, facultative, anoxic, aerobic and polishing steps of biological transformations.

4. A method as claimed in claim 1, and including the step of connecting said at least one subsequent reactor in parallel to said plurality of sequential reactors.

5. A method as claimed in claim 1, and further including the step of directing said influent material to a plurality of said stages simultaneously.

6. A method as claimed in claim 1, and further including the step of directing the said material separated from said portion of the contents to more than one subsequent reactor.

7. A method as claimed in claim 1, and further including the step of directing the said contents of a preceding stage to more than one subsequent stage.

8. A method as claimed in claim 1, wherein said sequential reactors comprise alternating reactors, and further including the steps of subjecting said influent alternatively to anaerobic and aerobic reactions.

9. A method as claimed in claim 8, wherein said alternating reactors are selected from the group consisting of anaerobic and aerobic zones, and alternating aerobic and anaerobic conditions in the same reaction vessel.

10. A method as claimed in claim 9, and further including the step of exposing said material and intermediate metabolic products in at least one stage to both anaerobic and aerobic biomasses simultaneously.

11. A method as claimed in claim 1, and further including the steps of applying to at least one of said reactors an action selected from the group consisting of electric current, magnetic field, coagulation-flocculation means, oxidation-reduction means, adsorption means and biostimulators.

12. A method as claimed in claim 11, wherein said electric current is selected from the group consisting of direct current, alternating current, and a partially rectified current with back pulses.

13. A method as claimed in claim 11, wherein said magnetic field is selected from the group consisting of a field from a permanent magnet and a field from an electromagnet.

14. A method as claimed in claim 11, wherein said coagulation-flocculation means is selected from the group consisting of iron, aluminum salts, electrolytic iron, aluminum ions, organic and inorganic polymers, and mixtures of these.

15. A method as claimed in claim 11, wherein said oxidation-reduction means is selected from the group consisting of hydrogen peroxide, iron ions, iron ions combined with hydrogen peroxide, nitrates, nitrites and other biologically reducible oxyions.

16. A method as claimed in claim 11, wherein said adsorption means is selected from the group consisting of powdered and granular activated carbons.

17. A method as claimed in claim 11, wherein said biostimulator is selected from the group consisting of steroids, amino acids, folic acid and metal naftenates.

18. A method as claimed in claim 1, and further including the step of adding powdered activated carbon downstream in said multi-stage biological treatment, so that said activated carbon is gradually moved upstream with said biomass, and exposed to said plurality of sequential reactors.

19. A method as claimed in claim 18, wherein said multi-stage biological treatment comprises treatment by alternating anaerobic and aerobic reactors, and said reactors are selected from the group consisting of aerobic and anaerobic reaction steps, recycle of streams among aerobic and anaerobic zones, alternating aerobic and anaerobic conditions in the same zone.

20. A method as claimed in claim 18, and further including the step of exposing said powdered activated carbon in at least one stage to both anaerobic and aerobic biomasses simultaneously.

21. A method as claimed in claim 12, and further including the step of using particles in the material being treated as a fluidized electrode.

22. A method as claimed in claim 12, wherein the said particles are selected from the group consisting of powdered activated carbon, granular activated carbon, biological granular sludge with powdered carbon, biological granular sludge, biological floccualant sludge with powdered carbon, and biological flocculant sludge.

23. The method as claimed in claim 1, further comprising the step of transferring a portion of the separated biomass to the said reactor of the same stage.

* * * * *